US010491935B2

(12) United States Patent
Gilley et al.

(10) Patent No.: US 10,491,935 B2
(45) Date of Patent: *Nov. 26, 2019

(54) MOVIE ADVERTISING PLACEMENT OPTIMIZATION BASED ON BEHAVIOR AND CONTENT ANALYSIS

(71) Applicant: Open Text SA ULC, Halifax (CA)

(72) Inventors: Thomas S. Gilley, New York, NY (US); Eric Hoffert, South Orange, NJ (US); Rabih Nassar, Ain Saadeh (LB); Paul Soukup, Arlington, VA (US)

(73) Assignee: Open Text SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/450,836

(22) Filed: Mar. 6, 2017

(65) Prior Publication Data

US 2017/0180771 A1    Jun. 22, 2017

Related U.S. Application Data

(63) Continuation of application No. 13/408,843, filed on Feb. 29, 2012, now Pat. No. 9,654,735, which is a
(Continued)

(51) Int. Cl.
*H04N 7/16* (2011.01)
*G06Q 30/02* (2012.01)
(Continued)

(52) U.S. Cl.
CPC ..... *H04N 21/2668* (2013.01); *G06Q 30/0206* (2013.01); *G06Q 30/0241* (2013.01);
(Continued)

(58) Field of Classification Search
CPC ......... H04N 21/2668; H04N 21/23418; H04N 21/23424; H04N 21/2393; H04N 21/2547;
(Continued)

(56) References Cited

U.S. PATENT DOCUMENTS 3,143,705 A * 8/1964 Currey ................. H04H 20/103
346/37
3,192,313 A * 6/1965 Brownstein ............ H04N 7/164
194/239
(Continued)

FOREIGN PATENT DOCUMENTS

EP    0526064    2/1993
EP    1513151    3/2005
(Continued)

OTHER PUBLICATIONS

Karidis, Antonis and Meliones, Apostolos, David-E: A Collaborative Working Paradigm for Distributed High-End Audio-Visual Content Creation, IEEE Int'l Conference on Multimedia Computing and Systems, 1999, (vol. 2) Jun. 7-11, 1999, pp. 328-332, IEEE #0-7695-0253-9.

(Continued)

*Primary Examiner* — Alfonso Castro
(74) *Attorney, Agent, or Firm* — Sprinkle IP Law Group

(57) ABSTRACT

An ad is placed in a movie, by analyzing inherent characteristics of the movie, analyzing viewed characteristics of the movie, analyzing viewer characteristics of a viewer of the movie, obtaining advertiser preferences for placement of the ad in the movie, determining costs of placing the ad in the movie based on the inherent characteristics of the movie, the viewed characteristics of the movie, the viewer characteristics and the advertiser preferences, and placing the ad in the movie in accordance with the inherent characteristics of the movie, the viewed characteristics of the movie, the viewer characteristics, the advertiser preferences and the determined costs.

20 Claims, 21 Drawing Sheets

Related U.S. Application Data continuation of application No. 11/592,901, filed on Nov. 3, 2006, now Pat. No. 8,145,528, which is a continuation-in-part of application No. 11/439,593, filed on May 23, 2006, now Pat. No. 7,877,689, which is a continuation-in-part of application No. 11/439,594, filed on May 23, 2006, now Pat. No. 8,724,969, which is a continuation-in-part of application No. 11/439,600, filed on May 23, 2006, now Pat. No. 8,755,673.

(60) Provisional application No. 60/683,662, filed on May 23, 2005.

(51) Int. Cl.
*H04H 20/10* (2008.01)
*H04H 60/33* (2008.01)
*H04H 60/59* (2008.01)
*H04H 60/66* (2008.01)
*H04N 21/81* (2011.01)
*H04N 21/84* (2011.01)
*H04N 7/173* (2011.01)
*H04N 21/234* (2011.01)
*H04N 21/239* (2011.01)
*H04N 21/442* (2011.01)
*H04N 21/475* (2011.01)
*H04N 21/2547* (2011.01)
*H04N 21/2668* (2011.01)

(52) U.S. Cl.
CPC ..... *G06Q 30/0251* (2013.01); *G06Q 30/0253* (2013.01); *G06Q 30/0254* (2013.01); *G06Q 30/0255* (2013.01); *G06Q 30/0257* (2013.01); *G06Q 30/0273* (2013.01); *H04N 7/165* (2013.01); *H04N 7/17318* (2013.01); *H04N 21/2393* (2013.01); *H04N 21/23418* (2013.01); *H04N 21/23424* (2013.01); *H04N 21/2547* (2013.01); *H04N 21/44213* (2013.01); *H04N 21/44222* (2013.01); *H04N 21/4756* (2013.01); *H04N 21/812* (2013.01); *H04N 21/84* (2013.01); *H04H 20/10* (2013.01); *H04H 60/33* (2013.01); *H04H 60/59* (2013.01); *H04H 60/66* (2013.01)

(58) Field of Classification Search
CPC .......... H04N 21/44213; H04N 21/812; G06Q 30/0206
USPC .......................................................... 725/14
See application file for complete search history.

(56) References Cited

U.S. PATENT DOCUMENTS

| | | |
|---|---|---|
| 5,101,364 A | 3/1992 | Davenport |
| 5,453,764 A | 9/1995 | Inagaki |
| 5,659,793 A | 8/1997 | Escobar et al. |
| 5,715,018 A | 2/1998 | Fasciano et al. |
| 5,751,883 A | 5/1998 | Ottesen et al. |
| 5,828,370 A | 10/1998 | Moeller et al. |
| 5,880,722 A | 3/1999 | Brewer |
| 5,886,692 A | 3/1999 | Brewer |
| 6,005,678 A | 12/1999 | Higashida et al. |
| 6,027,257 A | 2/2000 | Richards et al. |
| 6,088,722 A | 7/2000 | Herz et al. |
| 6,154,600 A | 11/2000 | Newman |
| 6,157,771 A | 12/2000 | Brewer |
| 6,173,317 B1 | 1/2001 | Chaddha et al. |
| 6,181,883 B1 | 1/2001 | Oswal |
| 6,192,183 B1 | 2/2001 | Taniguchi |
| 6,201,925 B1 | 3/2001 | Brewer |
| 6,262,777 B1 | 7/2001 | Brewer |
| 6,263,150 B1 | 7/2001 | Okada |
| 6,285,361 B1 | 9/2001 | Brewer |
| 6,317,141 B1 | 11/2001 | Pavley et al. |
| 6,317,147 B1 | 11/2001 | Tanaka |
| 6,400,886 B1 | 6/2002 | Brewer |
| 6,414,686 B1 | 7/2002 | Protheroe |
| 6,453,459 B1 | 9/2002 | Brodersen |
| 6,496,872 B1 | 12/2002 | Katz et al. |
| 6,496,981 B1 | 12/2002 | Wistendahl et al. |
| 6,504,990 B1 | 1/2003 | Abecassis |
| 6,546,188 B1 | 4/2003 | Ishii et al. |
| 6,580,437 B1 | 6/2003 | Liou et al. |
| 6,587,119 B1 | 7/2003 | Anderson |
| 6,597,375 B1 | 7/2003 | Yawitz |
| 6,631,522 B1 | 10/2003 | Erdelyi |
| 6,647,061 B1 | 11/2003 | Panusopone |
| 6,661,430 B1 | 12/2003 | Brewer |
| 6,698,020 B1 | 2/2004 | Zigmond et al. |
| 6,710,785 B1 | 3/2004 | Asai |
| 6,714,216 B2 | 3/2004 | Abe |
| 7,027,102 B2 | 4/2006 | Sacca |
| 7,055,168 B1 | 5/2006 | Errico |
| 7,337,403 B2 | 2/2008 | Pavley et al. |
| 7,421,729 B2 | 9/2008 | Zenoni |
| 7,516,129 B2 | 4/2009 | Risberg et al. |
| 7,559,017 B2 | 7/2009 | Datar |
| 7,818,763 B2 | 10/2010 | Sie et al. |
| 7,877,689 B2 | 1/2011 | Gilley |
| 8,141,111 B2 | 3/2012 | Gilley |
| 8,145,528 B2 * | 3/2012 | Gilley ............... G06Q 30/0241 705/14.4 |
| 8,171,509 B1 | 5/2012 | Girouard et al. |
| 8,724,969 B2 | 5/2014 | Gilley |
| 8,739,205 B2 | 5/2014 | Gilley et al. |
| 8,755,673 B2 | 6/2014 | Gilley |
| 9,330,723 B2 | 5/2016 | Gilley et al. |
| 9,648,281 B2 | 5/2017 | Gilley et al. |
| 9,653,120 B2 | 5/2017 | Gilley et al. |
| 9,654,735 B2 * | 5/2017 | Gilley ............... G06Q 30/0241 |
| 9,934,819 B2 | 4/2018 | Gilley |
| 9,940,971 B2 | 4/2018 | Gilley |
| 9,947,365 B2 | 4/2018 | Gilley |
| 10,090,019 B2 | 10/2018 | Gilley |
| 10,192,587 B2 | 1/2019 | Gilley |
| 2002/0013948 A1 | 1/2002 | Aguayo, Jr. et al. |
| 2002/0016961 A1 | 2/2002 | Goode |
| 2002/0028060 A1 | 3/2002 | Murata et al. |
| 2002/0053078 A1 | 5/2002 | Holtz et al. |
| 2002/0063737 A1 | 5/2002 | Feig et al. |
| 2002/0065678 A1 | 5/2002 | Peliotis et al. |
| 2002/0069218 A1 | 6/2002 | Sull et al. |
| 2002/0069405 A1 | 6/2002 | Chapin |
| 2002/0073417 A1 | 6/2002 | Kondo et al. |
| 2002/0092019 A1 | 7/2002 | Marcus |
| 2002/0100042 A1 * | 7/2002 | Khoo ............... G06Q 30/02 725/34 |
| 2002/0112249 A1 * | 8/2002 | Hendricks ............... H04H 20/10 725/136 |
| 2002/0131511 A1 | 9/2002 | Zenoni |
| 2002/0144262 A1 * | 10/2002 | Plotnick ............... G11B 27/005 725/32 |
| 2002/0152117 A1 * | 10/2002 | Cristofalo ............... G06Q 30/02 705/14.52 |
| 2002/0156829 A1 | 10/2002 | Yoshimine |
| 2003/0093790 A1 | 5/2003 | Logan et al. |
| 2003/0093792 A1 | 5/2003 | Labeeb et al. |
| 2003/0115552 A1 | 6/2003 | Jahnke |
| 2003/0149975 A1 * | 8/2003 | Eldering ............ H04N 7/17318 725/34 |
| 2003/0156824 A1 | 8/2003 | Lu |
| 2003/0225641 A1 | 12/2003 | Gritzmacher et al. |
| 2004/0008970 A1 | 1/2004 | Junkersfeld |
| 2004/0021685 A1 | 2/2004 | Denoue |
| 2004/0133909 A1 | 6/2004 | Ma |
| 2004/0128317 A1 | 7/2004 | Sull et al. |
| 2004/0131330 A1 | 7/2004 | Wilkins et al. |
| 2004/0133924 A1 | 7/2004 | Wilkins et al. |
| 2004/0139233 A1 | 7/2004 | Kellerman et al. |

(56) References Cited

U.S. PATENT DOCUMENTS

| | | |
|---|---|---|
| 2004/0158858 A1 | 8/2004 | Paxton et al. |
| 2004/0163101 A1 | 8/2004 | Swix et al. |
| 2004/0187160 A1 | 9/2004 | Cook et al. |
| 2004/0193488 A1 | 9/2004 | Khoo |
| 2004/0194128 A1 | 9/2004 | McIntyre et al. |
| 2004/0199923 A1* | 10/2004 | Russek ............ G06F 17/30265 719/310 |
| 2004/0268223 A1 | 12/2004 | Tojo |
| 2005/0097599 A1 | 5/2005 | Plotnick et al. |
| 2005/0137958 A1* | 6/2005 | Huber .................... G06Q 30/02 705/37 |
| 2005/0154679 A1 | 7/2005 | Bielak |
| 2005/0210145 A1 | 9/2005 | Kim et al. |
| 2005/0220439 A1 | 10/2005 | Carton et al. |
| 2005/0262539 A1 | 11/2005 | Barton et al. |
| 2005/0283754 A1 | 12/2005 | Vignet |
| 2006/0026655 A1 | 2/2006 | Perez |
| 2006/0098941 A1 | 5/2006 | Abe et al. |
| 2006/0120689 A1 | 6/2006 | Baxter |
| 2006/0179453 A1 | 8/2006 | Kadie et al. |
| 2006/0212897 A1 | 9/2006 | Li et al. |
| 2006/0239648 A1 | 10/2006 | Varghese |
| 2006/0248558 A1 | 11/2006 | Barton |
| 2006/0267995 A1 | 11/2006 | Radloff et al. |
| 2007/0124762 A1* | 5/2007 | Chickering ............ G06Q 30/02 725/35 |
| 2007/0157228 A1 | 7/2007 | Bayer et al. |
| 2008/0212937 A1 | 9/2008 | Son |
| 2009/0077580 A1 | 3/2009 | Konig et al. |
| 2009/0262749 A1 | 10/2009 | Graumann et al. |
| 2011/0116760 A1 | 5/2011 | Gilley |
| 2012/0227065 A1 | 9/2012 | Gilley |
| 2012/0251083 A1 | 10/2012 | Svendsen et al. |
| 2014/0212109 A1 | 7/2014 | Gilley |
| 2014/0212111 A1 | 7/2014 | Gilley |
| 2016/0073140 A1 | 3/2016 | Gilley et al. |
| 2016/0099024 A1 | 4/2016 | Gilley |
| 2017/0084308 A1 | 3/2017 | Gilley et al. |
| 2017/0223391 A1 | 8/2017 | Gilley et al. |
| 2017/0229148 A1 | 8/2017 | Gilley et al. |
| 2018/0158486 A1 | 6/2018 | Gilley |
| 2018/0204598 A1 | 7/2018 | Gilley |
| 2018/0366161 A1 | 12/2018 | Gilley |
| 2019/0122701 A1 | 4/2019 | Gilley et al. |

FOREIGN PATENT DOCUMENTS

| | | |
|---|---|---|
| EP | 1667454 | 6/2006 |
| WO | WO9430008 | 12/1994 |
| WO | WO9739411 | 10/1997 |
| WO | WO9806098 | 2/1998 |
| WO | WO9926415 | 5/1999 |
| WO | WO 00/14951 | 3/2000 |
| WO | WO0110127 | 2/2001 |
| WO | WO03085633 | 10/2003 |
| WO | WO2004104773 | 12/2004 |
| WO | WO2005018233 | 2/2005 |

OTHER PUBLICATIONS

Distributed Video Production (DVP) project, EU ACTS Project (AC089), OFES 95.0493, Apr. 12, 1997, 7 pgs., Computer Vision Group, Geneva, Switzerland, at http://cui.unige.ch/-vision/ResearchProjects/DVP/.

Lawrence A Rowe and David A. Berger, The Berkeley Distributed Video-on-Demand System, 1996, 17 pgs., University of California, Berkley, CA, at http://bmrc.berkeley.edu/research/publications/1998/NEC95.html#intro.

Office Action for U.S. Appl. No. 11/592,901, dated Oct. 5, 2009, 13 pgs.

Office Action for U.S. Appl. No. 11/439,593 dated Dec. 29, 2009, 12 pgs.

Hurwicz, Michael and McCabe, Laura, "Overview and Table of Contents", Special Edition Using Macromedia Flash MX, Aug. 15, 2002, Que Publishing, 5 pgs. at http://proquest.safaribooksonline.com/0-7897-2762-5.

Office Action for U.S. Appl. No. 11/439,593 dated Mar. 18, 2010, 14 pgs.

European Search Report and Written Opinion for Application No. EP 06771233 dated May 12, 2010 and completed May 5, 2010, 10 pgs.

"Solid Base from Which to Launch New Digital Video Research Efforts," PR Newswire Association LLC, Mar. 19, 2003, 5 pgs.

International Search Report and Written Opinion for International Patent Application No. PCT/US2007/023185, dated May 14, 2008, 8 pgs.

International Preliminary Report on Patentability (Chapter I) for International Patent Application No. PCT/US2007/023185, dated May 5, 2009, 7 pgs.

International Search Report and Written Opinion for International Patent Application No. PCT/US2006/020343, dated Sep. 16, 2008, 8 pgs.

International Preliminary Report on Patentability (Chapter I) for International Patent Application No. PCT/US2006/020343, dated Oct. 14, 2008, 8 pgs.

Office Action for U.S. Appl. No. 11/439,600, dated Aug. 11, 2010, 6 pgs.

Office Action for U.S. Appl. No. 11/439,594, dated Aug. 12, 2010, 10 pgs.

Office Action for U.S. Appl. No. 11/439,594, dated Jan. 19, 2011, 10 pgs.

Office Action for U.S. Appl. No. 11/439,600, dated Jan. 26, 2011, 11 pgs.

Office Action for U.S. Appl. No. 11/713,116, dated Mar. 17, 2011, 16 pgs.

Office Action for U.S. Appl. No. 11/713,115, dated Mar. 23, 2011, 21 pgs.

Gowans, David, "Cookies Tutorial, Part 1—Introduction to Cookies", 2001, 3 pgs. at http://www.freewebmasterhelp.com/ tutorials/cookies.

Learn That, Apr. 2004, 2 pgs., WayBackMachine Internet Archive, at http://www.learnthat.com/courses/computer/attach/index.html.

Revision Control, Mar. 2005, 7 pgs., WayBackMachine Internet Archive, at Wikipedia, http://en.wikipedia.org/ wiki/Revision_control.

Carden, Tim, Making a Slideshow—Macromedia Flash Tutorial, 2001, 10 pgs. at http://www.designertoday.com/Tutorials/Flash/939/Making.a.slideshow.Macromedia.Flash.Tutorial.aspx, 2001.

"Control Remote Desktops through a Web Browser," Winbook Tech Article, Feb. 2004, 2 pgs., www.winbookcorp.com, at http://replay.waybackmachine.org/20040205135404/http://winbookcorp.com/_technote/WBTA20000870.htm.

European Search Report for European Patent Application No. 10195448.5, dated Mar. 9, 2011, 11 pgs.

European Search Report for European Patent Application No. 10195472.5, dated Mar. 9, 2011, 11 pgs.

Office Action for U.S. Appl. No. 11/713,115, dated Sep. 8, 2011, 23 pgs.

Flickr, "Tags" Dec. 30, 2004; 1 pg., WayBackMachine Internet Archive at http://www.flickr.com/photos/tags/.

Office Action for U.S. Appl. No. 11/713,115, dated Mar. 13, 2012.

Examination Report for European Patent Application No. 10195472.5, dated Apr. 17, 2012, 6 pgs.

Examination Report for European Patent Application No. 06771233.1, dated Mar. 27, 2012, 5 pgs.

WebmasterWorld.com, "Ecommerce Forum: Using email address as a username," Oct. 2006, 3 pgs.

European Search Report for European Patent Application No. 10195448.5, dated Jul. 13, 2012, 5 pgs.

Final Office Action for U.S. Appl. No. No. 11/713,115, dated Nov. 14, 2012, 29 pgs.

Office Action for U.S. Appl. No. 13/011,002 dated Dec. 21, 2012, 19 pgs.

Office Action for U.S. Appl. No. 13/011,002, dated Apr. 22, 2013, 19 pgs.

(56) References Cited

OTHER PUBLICATIONS

Office Action for U.S. Appl. No. 11/439,600, dated May 30, 2013, 10 pgs.
Office Action for U.S. Appl. No. 11/439,594, dated Jun. 14, 2013, 11 pgs.
Office Action for U.S. Appl. No. 13/404,911, dated Aug. 8, 2013, 11 pgs.
Office Action for U.S. Appl. No. 13/408,843, dated Oct. 7, 2013, 15 pages.
Office Action for U.S. Appl. No. 13/408,843, dated May 7, 2014, 12 pgs.
Office Action for U.S. Appl. No. 13/011,002, dated Aug. 27, 2014, 22 pgs.
Office Action for U.S. Appl. No. 13/408,843, dated Aug. 28, 2014, 14 pgs.
Office Action for U.S. Appl. No. 14/229,601, dated Nov. 24, 2014, 8 pgs.
Office Action for U.S. Appl. No. 14/242,277, dated Nov. 25, 2014, 8 pgs.
Office Action for U.S. Appl. No. 11/713,115, dated Dec. 2, 2014, 27 pgs.
Duplicate file checking, I/O and Streams forum, CodeRanch, Nov. 2004, retrieved from <http://www.coderanch.com/t/277045/java-io/java/Duplicate-file-file-checking> and printed Oct. 21, 2014, 3 pgs.
Office Action for U.S. Appl. No. 13/408,843, dated Dec. 10, 2014, 16 pgs.
Summons to Attend Oral Proceedings pursuant to Rule 115(1) EPC for European Patent Application No. 10195448.5, dated Nov. 3, 2014, 4 pgs.
Summons to Attend Oral Proceedings pursuant to Rule 115(1) EPC for European Patent Application No. 10195472.5, dated Dec. 10, 2014, 5 pgs.
Office Action for U.S. Appl. No. 14/229,601, dated Mar. 16, 2015, 9 pgs.
Office Action for U.S. Appl. No. 14/242,277, dated Mar. 25, 2015, 10 pgs.
Office Action for U.S. Appl. No. 14/247,059, dated Jun. 3, 2015, 9 pgs.
Office Action for U.S. Appl. No. 14/229,601, dated Jun. 12, 2015, 12 pgs.
Office Action for U.S. Appl. No. 14/242,277, dated Jun. 24, 2015, 10 pgs.
Office Action for U.S. Appl. No. 13/408,843, dated Jul. 1, 2015, 16 pgs.
Office Action for U.S. Appl. No. 14/229,601, dated Oct. 5, 2015, 11 pgs.
Office Action for U.S. Appl. No. 14/242,277, dated Oct. 6, 2015, 11 pgs.
Office Action for U.S. Appl. No. 11/713,115, dated Oct. 5, 2015, 24 pgs.
Final Office Action issued for U.S. Appl. No. 13/011,002, dated Dec. 16, 2015, 22 pgs.
Final Office Action issued for U.S. Appl. No. 13/408,843, dated Jan. 13, 2016, 21 pgs.
Office Action for U.S. Appl. No. 14/885,632, dated Feb. 12, 2016, 23 pgs.
Office Action for U.S. Appl. No. 14/229,601, dated Mar. 18, 2016, 14 pgs.
Office Action for U.S. Appl. No. 14/242,277, dated May 5, 2016, 16 pgs.
Office Action for U.S. Appl. No. 14/968,425, dated Apr. 29, 2016, 8 pgs.
Office Action for U.S. Appl. No. 14/885,632, dated Jun. 3, 2016, 26 pgs.
Office Action for U.S. Appl. No. 13/408,843, dated Jun. 30, 2016, 24 pgs.
European Search Report for Application No. EP 15189067.0 dated Jun. 20, 2016, 10 pgs.
Office Action issued for U.S. Appl. No. 13/011,002, dated Sep. 8, 2016, 14 pages.
Notice of Allowance issued for U.S. Appl. No. 14/885,632, dated Sep. 12, 2016, 5 pages.
Office Action for U.S. Appl. No. 14/229,601, dated Oct. 24, 2016, 15 pgs.
Office Action for U.S. Appl. No. 14/242,277, dated Nov. 7, 2016, 15 pgs.
Office Action for U.S. Appl. No. 14/968,425, dated Nov. 21, 2016, 12 pgs.
Notice of Allowance for U.S. Appl. No. 14/885,632, dated Jan. 30, 2017, 3 pgs.
Notice of Allowance for U.S. Appl. No. 14/229,601, dated Feb. 28, 2017, 9 pgs.
Notice of Allowance for U.S. Appl. No. 14/242,277, dated Mar. 31, 2017, 9 pgs.
Office Action issued for U.S. Appl. No. 13/011,002, filed Apr. 26, 2017, 15 pages.
Notice of Allowance issued for U.S. Appl. No. 14/968,425, dated Jun. 19, 2017, 9 pages.
Notice of Allowance issued for U.S. Appl. No. 13/011,002, dated Jan. 25, 2018, 7 pages.
Notice of Allowance issued for U.S. Appl. No. 14/968,425, dated Feb. 23, 2018, 17 pages.
Office Action issued for U.S. Appl. No. 15/489,191, dated Mar. 7, 2018, 24 pages.
Notice of Allowance issued for U.S. Appl. No. 14/229,601, dated Jun. 22, 2017, 9 pages.
Notice of Allowance issued for U.S. Appl. No. 14/242,277, dated Jul. 28, 2017, 9 pages.
Office Action issued for U.S. Appl. No. 13/011,002, dated Oct. 17, 2017, 16 pages.
Notice of Allowance issued for U.S. Appl. No. 14/242,277, dated Nov. 15, 2017, 9 pages.
Notice of Allowance issued for U.S. Appl. No. 14/229,601, dated Dec. 13, 2017, 6 pages.
Notice of Allowance issued for U.S. Appl. No. 14/968,425, dated May 10, 2018, 15 pages.
Notice of Allowance issued for U.S. Appl. No. 15/489,191, dated Sep. 24, 2018, 9 pages.
Office Action issued for U.S. Appl. No. 15/891,885, dated Nov. 2, 2018, 13 pages.
Office Action issued for U.S. Appl. No. 15/918,804, dated Nov. 9, 2018, 11 pages.
Notice of Allowance issued for U.S. Appl. No. 15/489,191, dated Nov. 28, 2018, 6 pages.
Office Action issued for U.S. Appl. No. 15/365,308, dated Jan. 7, 2019, 11 pages.
Office Action issued for European Patent Application No. 15189067.0, dated Dec. 20, 2018, 4 pages.
Notice of Allowance issued for U.S. Appl. No. 15/918,804, dated Mar. 11, 2019, 9 pages.
Moritz et al., Understanding MPEG-4 Technology and Business Insights, Copyright 2005.
Office Action issued for U.S. Appl. No. 16/113,636, dated Apr. 2, 2019, 8 pages.
Notice of Allowance issued for U.S. Appl. No. 15/891,885, dated May 20, 2019, 9 pages.
Kang et al., "Creating Walk-Through Images from a Video Sequence of a Dynamic Scene," Teleoperators and Virtual Environments, Dec. 2004, 1 page.
Office Action issued for U.S. Appl. No. 15/495,041, dated Jun. 24, 2019, 32 pages.
Notice of Allowance issued for U.S. Appl. No. 15/365,308, dated Jul. 9, 2019, 6 pages.
Notice of Allowance issued for U.S. Appl. No. 15/918,804, dated Jul. 9, 2019, 6 pages.
Summons to Attend Oral Proceedings issued for European Patent Application No. 15189067.0, dated Jul. 23, 2019, 5 pages.
Notice of Allowance issued for U.S. Appl. No. 15/891,885, dated Aug. 28, 2019, 9 pages.
Notice of Allowance issued for U.S. Appl. No. 15/365,308, dated Sep. 18, 2019, 6 pages.

* cited by examiner

MOVIE ADVERTISING PLACEMENT OPTIMIZATION BASED ON BEHAVIOR AND CONTENT ANALYSIS

CROSS-REFERENCE TO RELATED APPLICATIONS

This application is a continuation of and claims a benefit of priority under 35 U.S.C. § 120 from U.S. patent application Ser. No. 13/408,843, filed Feb. 29, 2012, now U.S. Pat. No. 9,654,735, entitled "MOVIE ADVERTISING PLACEMENT OPTIMIZATION BASED ON BEHAVIOR AND CONTENT ANALYSIS," which is a continuation of and claims a benefit of priority under 35 U.S.C. § 120 from U.S. patent application Ser. No. 11/592,901, filed Nov. 3, 2006, now U.S. Pat. No. 8,145,528, entitled "MOVIE ADVERTISING PLACEMENT OPTIMIZATION BASED ON BEHAVIOR AND CONTENT ANALYSIS," which in turn claims priority from U.S. Provisional Application No. 60/683,662, filed May 23, 2005, and which is a continuation-in-part of U.S. patent application Ser. No. 11/439,600, filed May 23, 2006, now U.S. Pat. No. 8,755,673, entitled "METHOD, SYSTEM AND COMPUTER PROGRAM PRODUCT FOR EDITING MOVIES IN DISTRIBUTED SCALABLE MEDIA ENVIRONMENT," U.S. patent application Ser. No. 11/439,594, filed May 23, 2006, now U.S. Pat. No. 8,724,969, entitled "METHOD, SYSTEM AND COMPUTER PROGRAM PRODUCT FOR EDITING MOVIES IN DISTRIBUTED SCALABLE MEDIA ENVIRONMENT," and U.S. patent application Ser. No. 11/439,593, filed May 23, 2006, now U.S. Pat. No. 7,877,689, entitled "DISTRIBUTED SCALABLE MEDIA ENVIRONMENT FOR MOVIE ADVERTISING PLACEMENT IN USER-CREATED MOVIES". The disclosures of all applications referenced in this paragraph are hereby incorporated by reference in their entireties.

TECHNICAL FIELD

The invention relates to processing recorded video and audio, and more specifically, to techniques for determining where in a movie to insert an ad.

BACKGROUND OF THE RELATED ART

Linear media editing systems used for analog audio, video tape and photographic film are manual, time consuming and cumbersome to reduce content into a final form and distribute. In more recent times computer systems allow for time efficient non-linear video editing systems. Current non-linear editing on computer oriented systems involves capturing media content permitting rapid access to the media content at any point in the linear sequence for moving portions into any order and storing the media content on a storage device, such as a magnetic disk drive or digital versatile disk (DVD).

The average person currently has small set of alternatives for editing content from media capture devices such as camcorders, camera phones, audio recorders, and other media capture devices without having to incur the costs of a computer system and software for editing. In addition, non-linear editing systems are complex and very difficult to use.

People capture various random and personally interesting events, such as work, travel and entertainment event using their camcorders or camera phones. To edit this content, people require easy to use non-linear editing systems that facilitate editing without a high degree of computer or editing skill.

Media content storage technologies provide for storing great amounts of interactive multimedia, for example, the DVD format. Unfortunately, the DVD Specification for authoring is very complex, as are the computer systems that attempt to embody it. A further disadvantage of conventional DVD authoring systems is that they provide a DVD author with only minimal control and flexibility.

The process of authoring a DVD includes a number of complex steps and equipment. Accordingly, there is a need for authoring systems and methods that reduces the time, cost and complexity of the authoring and distributing DVD.

Separate and distinct systems for computer based non-linear editing, DVD authoring, and distributions are known. However, no system exists that enables an ad to be flexibly placed in different areas of a movie according to an automatic procedure.

SUMMARY OF THE INVENTION

In accordance with an aspect of this invention, there is provided a method of placing an ad in a movie. At least one of the following is performed: analyzing inherent characteristics of the movie, analyzing viewed characteristics of the movie, analyzing viewer characteristics of a viewer of the movie, and obtaining advertiser preferences for placement of the ad in the movie. Costs of placing the ad in the movie are determined based on the inherent characteristics of the movie, the viewed characteristics of the movie, the viewer characteristics and the advertiser preferences. The ad is placed in accordance with the inherent characteristics of the movie, the viewed characteristics of the movie, the viewer characteristics, the advertiser preferences and the determined costs. The movie is delivered to the viewer. Statistics are collected regarding the viewing of the movie by the viewer. At least one report is generated regarding the movie viewing statistics. It is not intended that the invention be summarized here in its entirety. Rather, further features, aspects and advantages of the invention are set forth in or are apparent from the following description and drawings.

DETAILED DESCRIPTION

As used herein and in the claims, the term "movie" refers to video and/or audio data intended for display to a human. In some cases, the video and audio data are separate but associated data, while in other cases, the video and audio are combined. In still other cases, video exists without audio, and vice-versa. Video encompasses still image data and moving image data.

The disclosures of the following patents are hereby incorporated by reference in their entirety:

| U.S. Pat. No. | Issue Date | Title |
| --- | --- | --- |
| 5,880,722 | Mar. 9, 1999 | Video cursor with zoom in the user interface of a video editor |
| 5,886,692 | Mar. 23, 1999 | Attracting/repelling edit blocks in a user interface of a video editor |
| 6,027,257 | Feb. 22, 2000 | Pan and tilt unit |
| 6,157,771 | Dec. 5, 2000 | Method and apparatus for seeking within audiovisual files |
| 6,181,883 | Jan. 30, 2001 | Dual purpose camera for VSC with conventional film and digital image capture modules |
| 6,201,925 | Mar. 13, 2001 | Method and apparatus for editing video files |
| 6,262,777 | Jul. 17, 2001 | Method and apparatus for synchronizing edited audiovisual files |
| 6,285,361 | Sep. 4, 2001 | Method and apparatus for clipping video segments from an audiovisual file |
| 6,400,886 | Jun. 4, 2002 | Method and apparatus for stitching edited video segments |
| 6,661,430 | Dec. 9, 2003 | Method and apparatus for copying an audiovisual segment |

Figure 1:
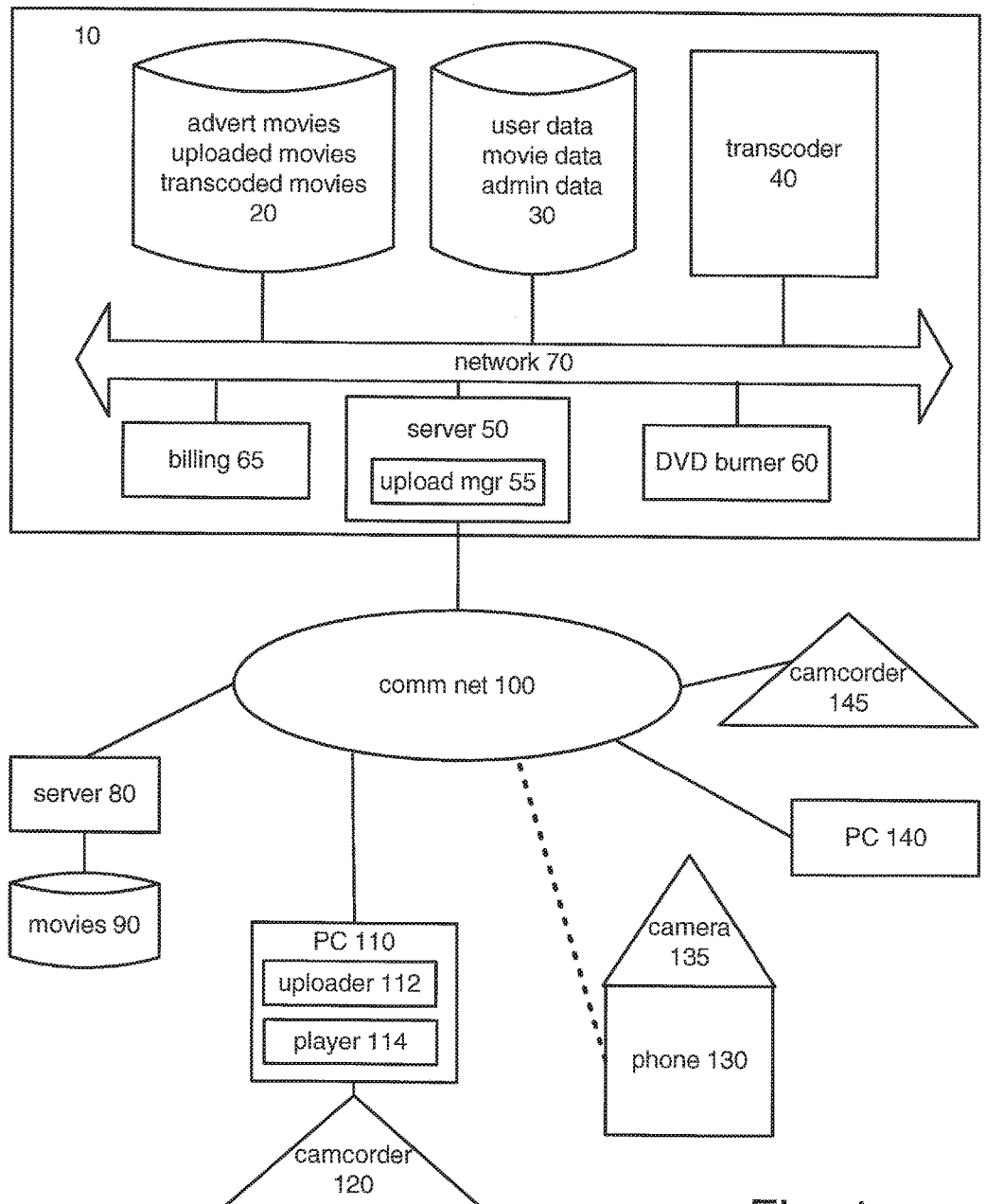
FIG. 1 is a configuration diagram for one embodiment of the invention wherein the transcoder is used via a public communication network.

There are several environments in which a user might want to use a movie. Turning to FIG. 1, an environment including public communication network 100 is shown. Network 100 may be the Internet. Coupled to network 100 are movie system 10, server 80, PC 110, phone 130, PC 140 and camcorder 145. Coupling occurs via wireline and/or wireless communication lines, possibly with intermediate computers such as an Internet service provider (not shown).

Movie system 10 includes videobase 20, database 30, transcoder 40, server 50, DVD burner 60 and internal network 70. In some embodiments, videobase 20 and database 30 are combined. Elements 20, 30, 40, 50 are computers programmed according to the invention, and include suitable processors, memory, storage and communication interfaces; and each element may be embodied in one or many physical units depending on factors such as expected processing volume, redundant hardware design and so on.

Videobase 20 serves to store movies uploaded by users, in their uploaded format, and to store transcoded versions of these movies. Videobase 20 also stores advertisement movies, referred to herein as "ads", intended for inclusion in the transcoded movies.

Database 30 serves to store data for movie system 10, including data relating to users of movie system 10, movies processed by movie system 10, and suitable administrative data such as usage, throughput and audit trail information. In some embodiments, users use movie system 10 for free and the suppliers of ads pay upon ad viewing. In other embodiments, users pay based on usage or a flat rate.

Transcoder 40 serves to receive uploaded movies and process them to generate transcoded movies, as described in detail below with regard to FIG. 7.

Server 50 receives requests from users via network 100 and responds thereto. In cases where responding to a request requires the services of transcoder 40, server 50 passes appropriate messages between transcoder 40 and network 100. Server 50 also functions as a firewall to protect network 70 from improper usage.

Server 50 executes upload manager 55, a software program that works with uploader 112, described below, to upload a movie to server 50.

DVD burner 60 is responsive to commands from transcoder 40 to create a digital video disk, which is then shipped via conventional physical shipping services.

Billing program 65 examines usage data created by transcoder 40 and server 50. The usage data is part of the administrative data in database 30. Billing program 65 then generates invoices and applies authorized payments. For example, some users may have preauthorized charges to their credit cards, telephone bills or bank accounts for their usage of movie system 10. As another example, transcoded movies created by users may include advertising, for which the advertisers agree to pay based on number of views, and if so, billing system 65 arranges payments to users based on usage of the transcoded movies with advertising.

There is a cost to store and distribute movies. To offset this cost, and to reward users, movie system 10 enables movie creators to include ads, either manually or automatically, in their movies. Movie system 10 enables flexible ad placement, including at the start or end of a movie, within selected frames of a movie, and at a selected location and size within the selected frames. Advertisers generally pay for placement of their ads based on number of times their ad is viewed, and possibly in accordance with the popularity of the place in the movie where the ad is inserted, how much time the ad is inserted for, and the size of the ad relative to a movie frame.

Internal network 70 serves to carry communication traffic between the elements of movie system 10. Internal network 70 may be a local area network at a single premises, or may span multiple premises.

Server 80 can be a computer coupled to storage 90. Server 80 responds to requests from communication network 100 by providing movies stored in storage 90. By providing the address of server 80 to movie system 10, one of the movies stored in storage 90 can be used as an input for transcoder 40.

PC 110 can be a personal computer coupled to camcorder 120. Camcorder 120 enables a user to record a movie and transfer the movie to PC 110.

PC 110 executes uploader 112 and player 114. Uploader 112 can be a software program that enables a movie to be uploaded from PC 110 to server 50. Player 114 can be a software program that enables PC 110 to view and edit movies, in conjunction with transcoder 40. When PC 110 registers with server 50, server 50 downloads uploader 112 and player 114 to PC 110.

Uploader 112 functions to locate movie files stored in PC 110, and to manage transmission of the movie files to upload manager 55 of server 50 using a suitable protocol such as the secure file transfer protocol (sftp). In embodiments having a peer-to-peer network for downloading, such as networks using the bittorrent protocol, the peer-to-peer network is also used for uploading. Since movie files are large, the file uploading may be interrupted; uploader 112 enables the uploading to resume at its interruption point. In some embodiments, uploader 112 converts a very large file, such as a 36 Mb file in DV format, to a smaller file of comparable visual quality, such as a 3 Mb files in MPEG format. Uploader 112 enables the user of PC 110 to select a file for uploading; to monitor the status of the upload, such as percent completed and speed of uploading; to pause and resume the uploading; and to cancel the uploading.

Player 114 can be a client application for a PC browser. In some embodiments, player 114 resides on a portable device such as a mobile phone or network-attached digital video camera without a browser, and in these embodiments, player 114 can be a network enabled client application.

Player 114 enables a user to view a movie, including forward seek and rewind functions; to seek the compressed video on a remote server using random seek points; to request a movie download from the random seek point, for example, in accordance with U.S. Pat. No. 6,157,771, the disclosure of which is hereby incorporated by reference in its entirety; and to use the functions described below with regard to FIG. 7 on the movie, including creating and editing deep tags, creating and editing mash-ups, adding special effects, providing sharing permission to other users, creating virtual and/or physical DVDs, inserting ads, and creating and editing watermarks. FIG. 8, discussed below, shows a graphical user interface for player 114.

Phone 130 can be a wireless communication device executing versions of uploader 112 and player 114 adapted for the device capabilities of phone 130. Phone 130 can be coupled to camera 135, which serves to capture images and provide the captured images to phone 130 as a movie signal. In some embodiments, phone 130 uses the multimedia messaging service (MMS) protocol to transmit and/or receive movies. In other embodiments (not shown), phone 130 communicates with a local network using a protocol such as WiFi, and the WiFi network in turn communicates with communication network 100.

PC 140 can be a personal computer that is able to view transcoded movies by obtaining an address for the movie, or a segment thereof, and providing the address to server 50. As an example, a user of PC 110 or a user of phone 130 may upload a movie to movie system 10, edit the uploaded movie, and provide to the user of PC 140, via email, an address of an edited segment that the user of PC 140 is permitted to view.

Camcorder 145 can be a network enabled movie capture device configured to upload its recordings to movie system 10. In some embodiments, there is at least one predefined user group able to immediately edit information uploaded from camcorder 145. This configuration is useful in a security application, for example.

The user of PC 110 or phone 130 serves as an editor. PC 110, phone 130, PC 140 and camcorder 145 are each at respective locations that are remote from the location of movie system 10.

Figure 2:
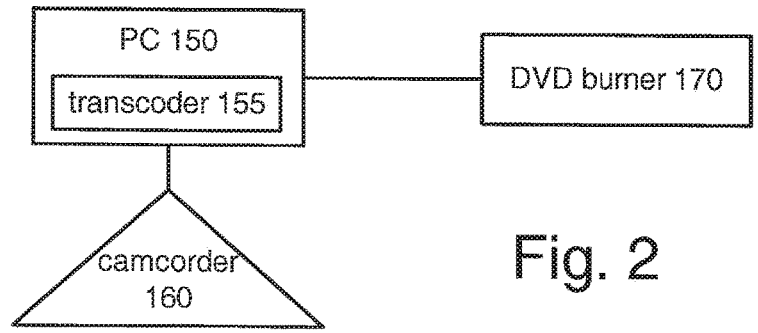
FIGS. 2-4 are configuration diagrams for other embodiments of the invention wherein the transcoder resides locally.
Figure 3:
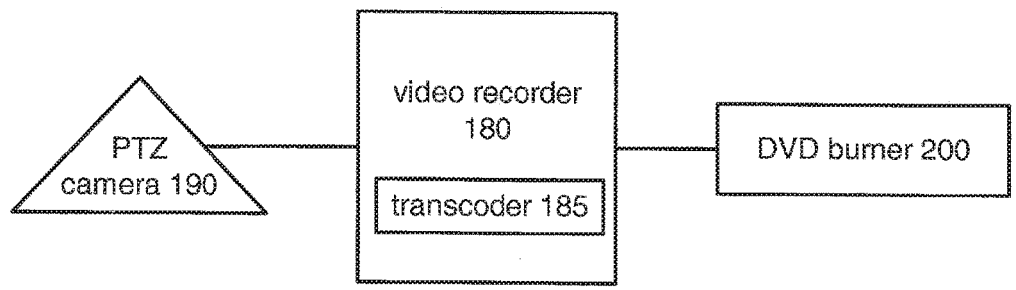
Figure 4:
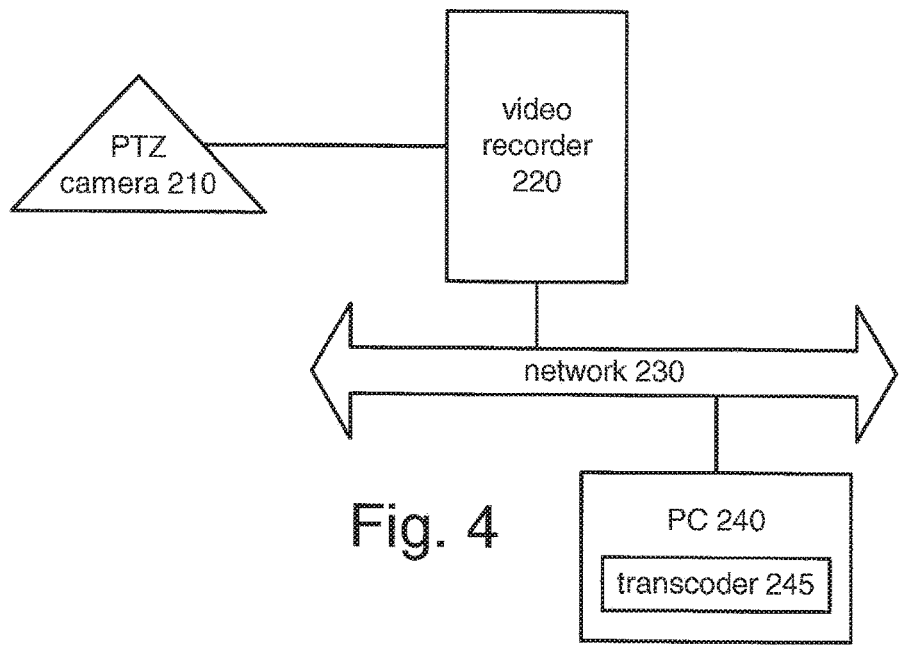

FIGS. 2-4 illustrate other embodiments of the invention wherein the transcoder is local to the movie file, that is, the movie file is not uploaded via a public communication network. This is sometimes referred to as a transcoder appliance model.

FIG. 2 shows PC 150, camcorder 160 and DVD burner 170. Camcorder 160 is for recording a movie and providing the recorded movie to PC 150. PC 150 can be a personal computer operative to receive and store a recorded movie; to enable a user to edit the stored movie using transcoder 155, which can be a software program operative in a similar manner as transcoder 40; and to provide a transcoded movie to DVD burner 170 for recording thereon, in similar manner as DVD burner 60.

FIG. 3 shows video recorder 180, robotic camera with pan-tilt-zoom (PTZ) control 190, and DVD burner 200. Robotic camera 190 is operative to provide a video signal to video recorder 180. Video recorder 180 can be a computer operative to receive and store the video signal from robotic camera 190, to enable a user to edit the stored video using transcoder 185, which can be a software program operative in a similar manner as transcoder 40; and to provide a transcoded movie to DVD burner 200 for recording thereon, in similar manner as DVD burner 60.

FIG. 4 shows robotic camera 210, video recorder 220, private network 230 and PC 240. PTZ camera 210 is operative to provide a video signal to video recorder 220. Video recorder 220 is operative to receive and store the video signal from robotic camera 210, and to provide the stored video to PC 240 via private network 230. Private network 230 can be a local area network, virtual private network, or the like, which serves to couple video recorder 220 and PC 240. PC 240 can be a personal computer operative to receive video from video recorder 220, sometimes in response to a command from PC 240 and sometimes on a periodic or as-available basis from video recorder 220; to store the received video; and to execute transcoder 245 to edit the stored video to produce transcoded video. Transcoder 245 can be a software program operative in a similar manner as transcoder 40.

Figures 5A, 5B:
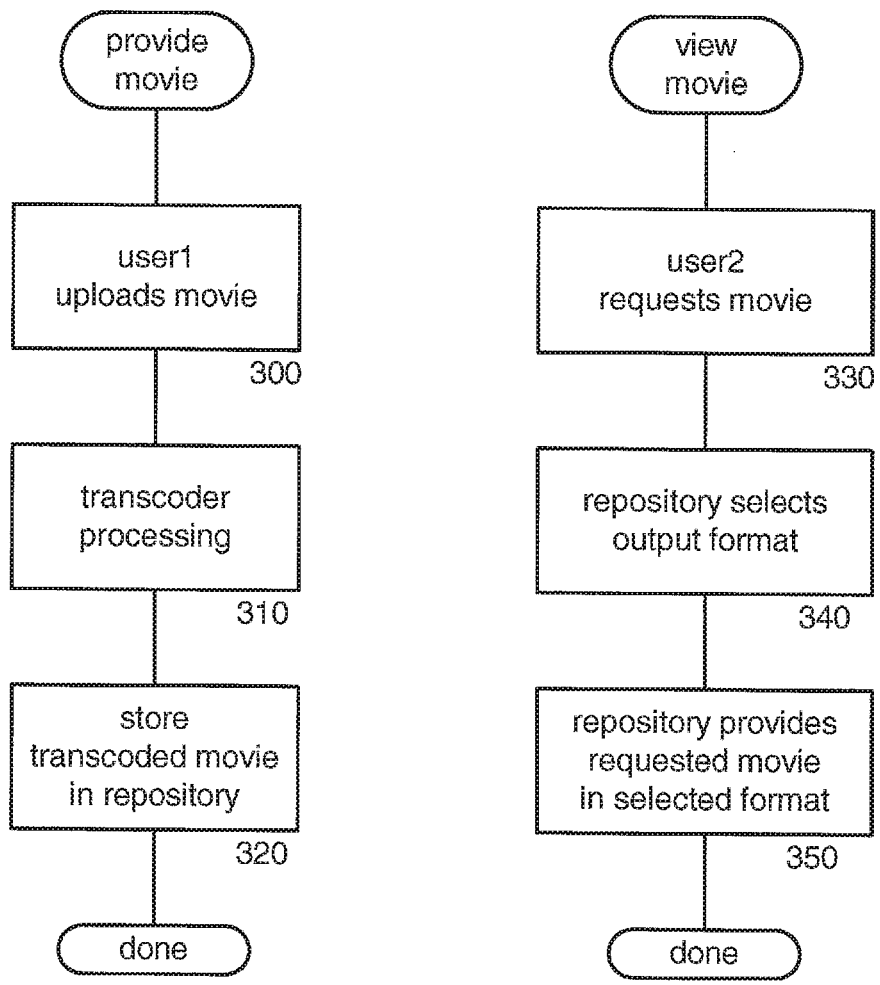
FIGS. 5A-5B are flowcharts depicting high-level operation of movie uploading and downloading, respectively.
Figure 6:
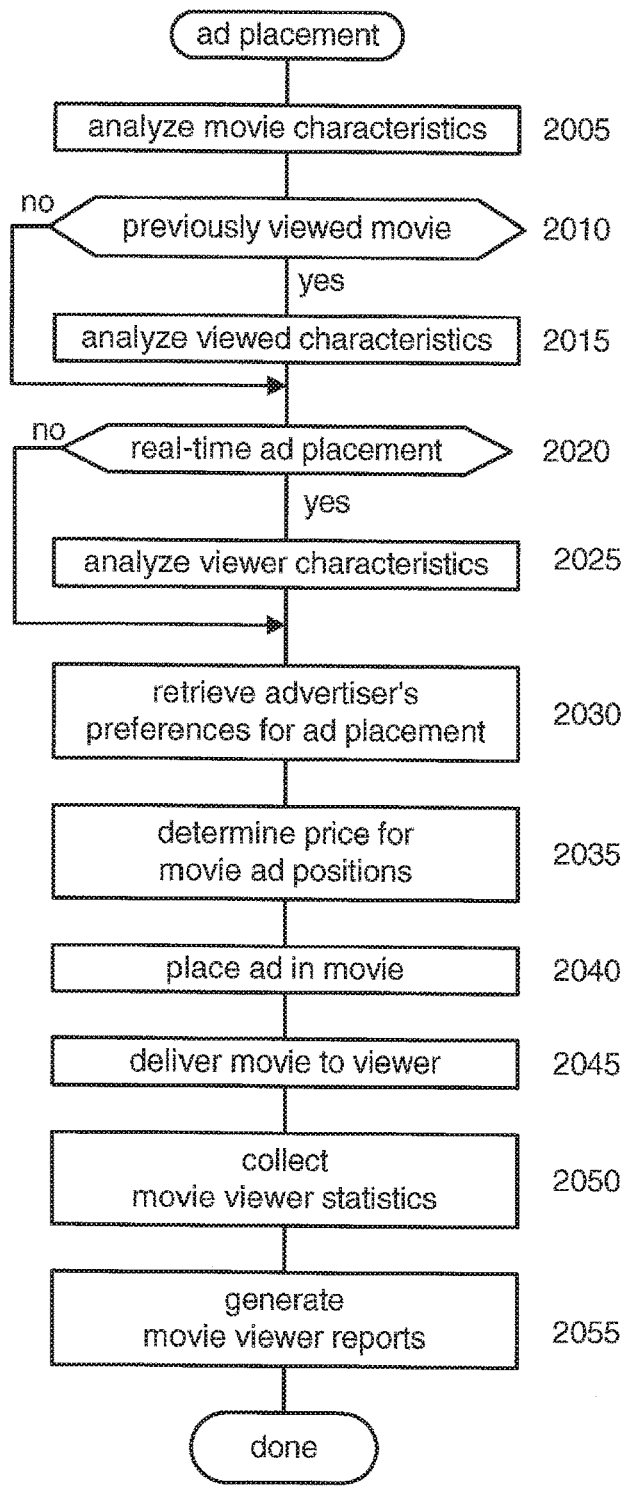
FIG. 6 is a flowchart depicting a high level ad placement procedure.

FIGS. 5-6 are flowcharts depicting high-level operation of movie uploading and downloading, respectively.

Turning to FIG. 5, at step 300, user1 (not shown) at PC 110 uploads a movie to server 50, such as a movie recorded by camcorder 120. The uploaded movie is in an original format, also referred to as a first format or an uploaded format. In some cases, user1 provides an address of server 80, and instructs server 50 to retrieve the movie from server 80. Server 50 stores the uploaded movie in videobase 20. At step 310, transcoder 40 processes the uploaded movie, enabling the user to edit the uploaded movie as described in detail below, to produce a transcoded movie. The transcoded movie is in a proxy format, also referred to as a second format or an intermediate format.

At step 320, transcoder 40 stores the transcoded movie in videobase 20. As described below, user1 can grant permission to other users to view the whole of the transcoded movie, or to view segments of the transcoded movie, by providing suitable addresses to the authorized users.

Turning to FIG. 5B, at step 330, user2 (not shown), who has received permission to view the transcoded movie, sends a request for the movie to server 50. The request includes information about the display capability of the device used by user2, such as phone 130 or PC 140.

At step 340, server 50 requests the selected movie from videobase 20, indicating the format for the movie.

At step 350, if the requested format happens to match the stored format, then the movie is provided directly to server 50. Otherwise, videobase 20 is operative to convert the format from the stored format to the requested format. The movie is provided in the requested format, also referred to as a third format, a downloaded format, or an output format. Server 50 then sends the provided movie to user2 via suitable distribution method such as streamed video or podcast, or presentation on a web page, blog, wiki, really simple syndication (RSS) or other technique. In some embodiments, videobase 20 sends the stored movie to transcoder 40, for conversion to the requested format, and then transcoder 40 provides the movie in the requested format to server 50.

FIG. 6 depicts the overall ad placement process.

At step 2005, transcoder 40 analyzes the movie characteristics. As used herein and in the claims, inherent movie characteristics means information in the movie itself, without reference to usage or viewing. Examples of inherent movie characteristics include motion, scene changes, face presence, audio track loudness, and so on. In this document, inherent movie characteristics are sometimes referred to as movie characteristics.

At step 2010, transcoder 40 determines whether the movie has been previously viewed. If not, processing proceeds to step 2020. If the movie has been previously viewed, then at step 2015, transcoder 40 analyzes the viewed characteristics of the movie, also referred to herein as the popularity of the movie. Viewed characteristics include number of times that the movie has been requested, number of times that a link or deep tag to the movie has been sent from one viewer to another potential viewer, number of deep tags in the movie, number of times that a particular movie segment was replayed, number of times that viewers paused at a particular movie position, and so on. In some embodiments, the viewed characteristics are associated with the demographics of the viewer, such as gender, age, location, income, interests and so on.

At step 2020, transcoder 40 determines if the ad placement is occurring in real time. As explained below, movie system 10 can operate in one or more of the following modes:

by placing one or more ads in a movie, storing the movie plus ads, and then delivering the stored movie plus ads to a viewer in response to the viewer request, referred to as non-real time ad placement mode;

As explained below, non-real time ad placement mode has a static version and a variable version. In the static version, the ad is placed once, and remains in its place for the duration of the advertising period, i.e., the timeframe that the advertiser pays for. In the variable version, the ad's position may change from time to time, in accordance with changes in the viewed characteristics of the movie and changes in other advertiser's interest in having their ads included in the movie.

by receiving a viewer request for a movie, then placing ads in the movie and delivering the movie plus ads to the viewer, referred to as real-time ad placement mode;

by placing a first set of ads in the movie, storing the movie plus ads, receiving a viewer request, then placing a second set of ads in the movie, and delivering the movie with the first and second sets of ads to the viewer, referred to as real time plus non-real time ad placement mode, or hybrid ad placement mode.

Non-real time ad placement mode enables movie system 10 to operate in essentially a broadcast fashion, for ads. Real-time ad placement mode enables movie system 10 to operate in a narrowcast fashion, wherein the characteristics of the viewer determine what ads are sent to the viewer. If movie system 10 is operating in non-real time ad placement mode, then processing proceeds to step 2030. If movie system 10 is operating in real-time ad placement mode, or hybrid ad placement mode, then at step 2025, transcoder 40 analyzes the viewer's characteristics. In this context, characteristics of the viewer includes demographic information as well as activity of the viewer, such as entering a keyword, the material previously viewed by the viewer and so on.

At step 2030, transcoder 40 retrieves the advertiser's preferences for ad placement. Advertiser preferences can specify movie characteristics, movie popularity characteristics, viewer characteristics, and how much the advertiser is willing to pay depending on the combination of features delivered, which may include whether the ad is viewed or whether the viewer takes an action relating to the ad. For example, some ads include hyperlinks that a viewer can click on, and the advertiser may be willing to pay a first rate if the ad is merely presented to the viewer, and a second rate if the viewer clicks on the hyperlink.

At step 2035, transcoder 40 determines prices for positioning ads at various places in the movie. The price determination procedure can be a function of the movie characteristics, the viewed characteristics, the viewer characteristics, advertiser demand, and the price setting mechanism.

At step 2040, transcoder 40 places the at least one ad in the movie. It will be appreciated that an advertiser's rules may specify manual placement, in which case transcoder 40 notifies a person associated with the advertiser of the prices for placing the ad at various positions, and a human manually selects ad placement.

At step 2045, the movie is delivered to the viewer that requested the movie. When movie system 10 operates in non-real time ad placement mode, there is a step (not shown) of storing the movie plus ads in videobase 30 prior to delivering the movie to the requesting viewer.

At step 2050, statistics are collected about movie viewing, such as by server 50 receiving play trails (discussed below), notices of deep tag transmissions and so on, and storing them in database 30.

At step 2055, appropriate viewing reports are generated by billing program 65, server 50 and transcoder 40.

A prior art search engine enables advertisers to bid on keywords. During a set-up phase, the advertiser selects the desired keyword(s), and their maximum bid price. In operation, when a searcher enters the desired keyword, advertiser ads are presented in an order corresponding to their bid amounts, that is, the ad with the highest bid is listed first, followed by ads with sequentially lower bid amounts. When the searcher clicks on an ad, the search engine bills the advertiser, that is, if the ad is merely presented with no response from the searcher, the advertiser does not pay. Advertisers can then view reports on the "click-through" activities for their advertisements.

In an embodiment wherein the price of placing an ad in a movie varies, advertisers can determine the price at least in part by bidding. For example, movie system 10 can determine a starting price based for ad placement in portions of a movie based on popularity, level of motion, length of ad, whether the ad is full-motion video or a static image, and so on. Advertisers can then (i) submit specific bids for specific movies, ex: $100 for placement in movie xyz for two weeks, (ii) can define bidding rules, ex: placement in any travel movies viewed at least 100 times per day, ex: placement in any movie segment having a deep tag with the text label "airplane" and where the movie is one of the most popular 1,000 movies for the day, or (iii) can define results and how much they are willing to pay, ex: at least 100 views per hour by girls of age 10-14 located in California at a cost of up to $20 per hour.

The value placed upon media inventory across a timeline of a movie can vary dramatically and dynamically based on continuously updated statistics on both behavioral and contextual analysis of the video stream; for example the most prized video segments may be those that are most popular and contain the deep tags for "cars", "hotels", "swimming", etc.

Figure 7A:
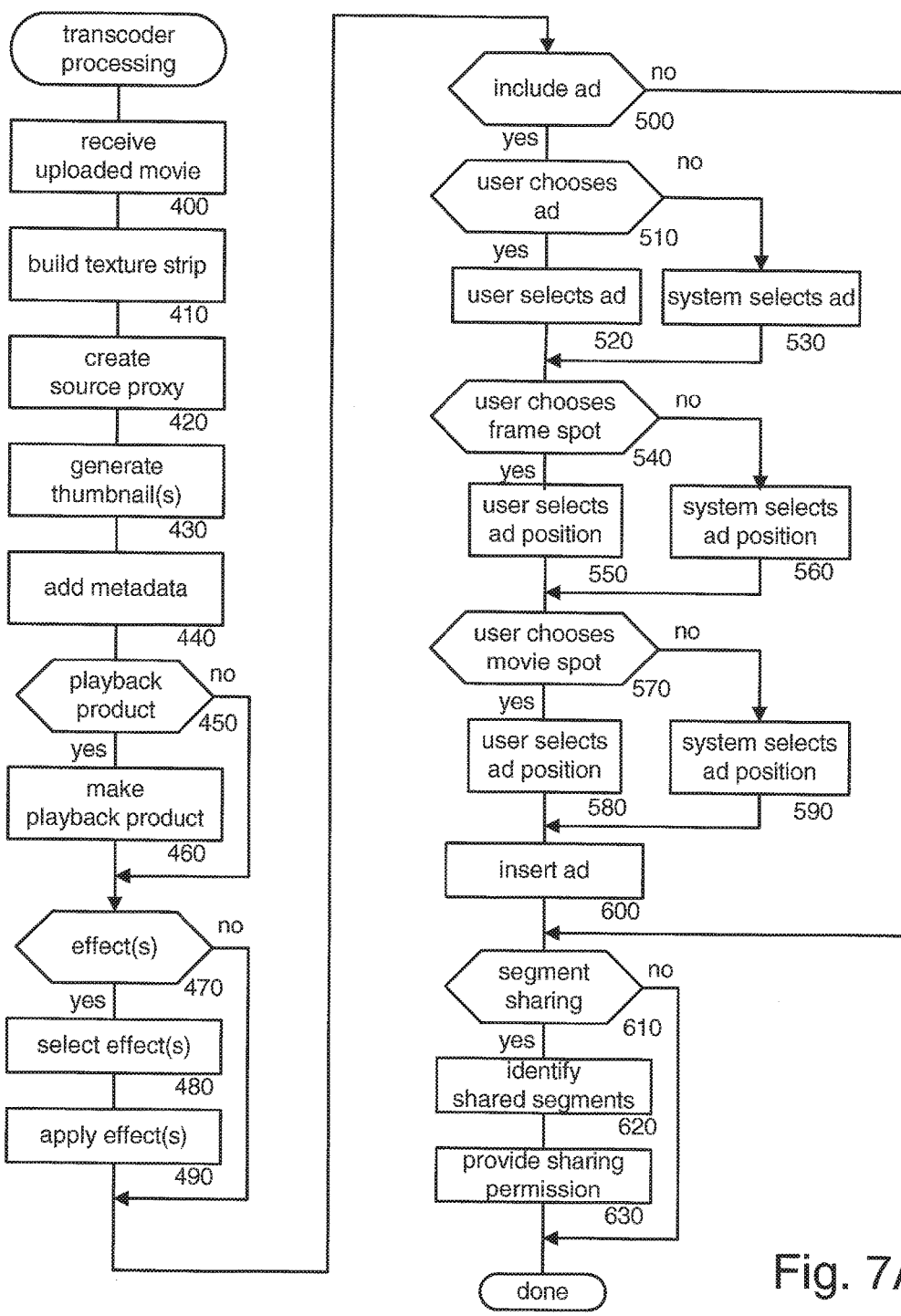
FIGS. 7A and 7B are a flowchart depicting transcoder operation.
Figure 7B:
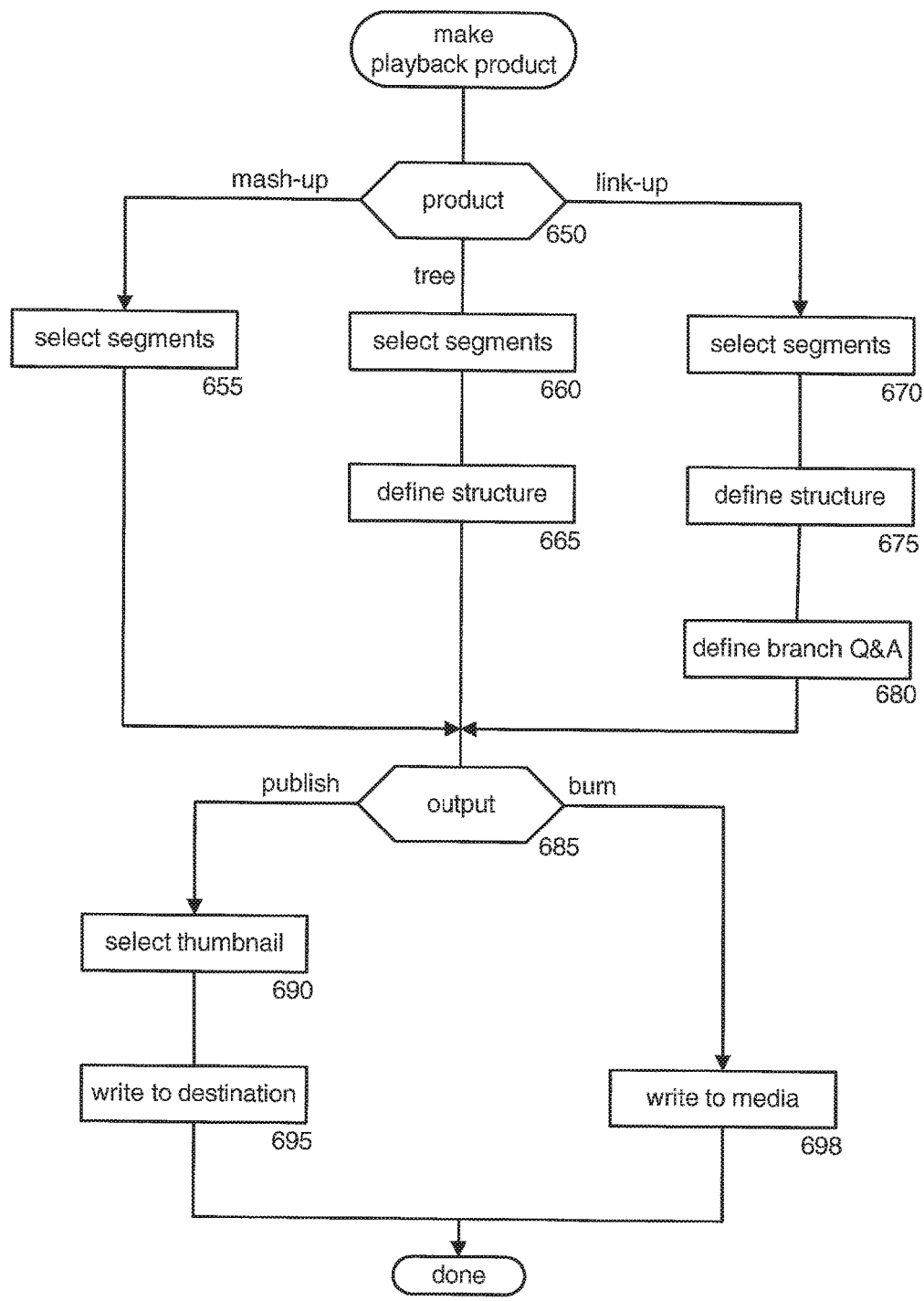
Figure 8:
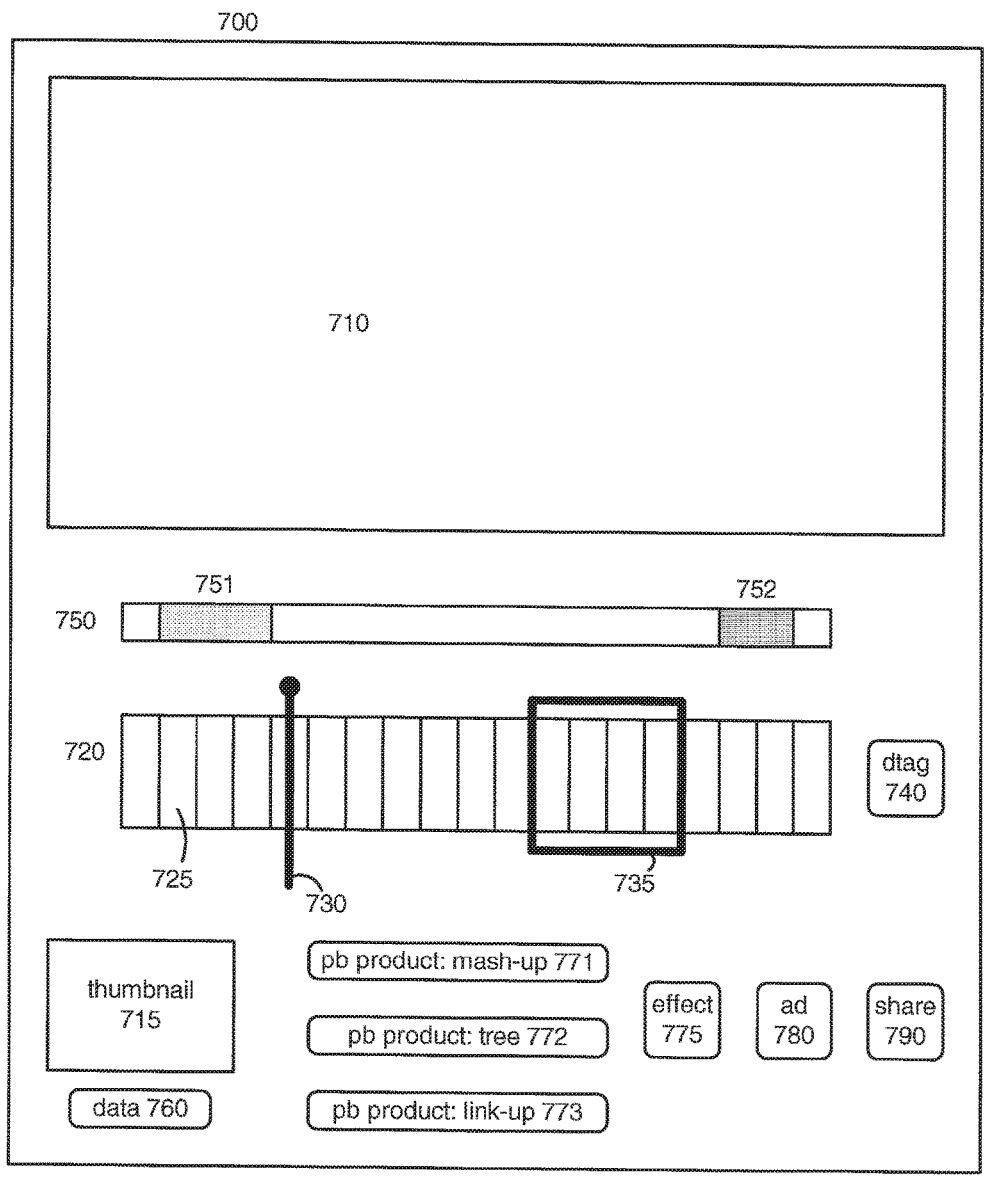
FIG. 8 is a diagram of a user interface for editing a movie.

FIGS. 7A and 7B, collectively referred to as FIG. 7, are a flowchart depicting transcoder 40 operation.

As an overview, transcoder 40 receives an uploaded movie, creates a representation for easy editing, and adds user-supplied editing data (steps 400-440) to create a transcoded movie. Then, at the user's option, some, all or none of the following functions can be performed, in any desired sequence, and in as many editing sessions as desired:

creating a playback product using the transcoded movie, the playback product being one of a mash-up, a tree or a link-up (steps 450-460);

adding special effects (steps 470-490), including advertising movies in the transcoded movie (steps 500-600), and providing permission for other users to view all of the transcoded movie, or segments of the transcoded movie (steps 610-630).

Including an advertising movie in a transcoded movie ensures that even if the viewer of the transcoded movie has a filter for blocking advertising pop-ups and the like, the included advertising movie is viewed, since the filter considers the advertising movie to be part of requested content.

At step 400 of FIG. 7, transcoder 40 receives the uploaded video, either from the user or from another web site. The video may be in one of several formats, some of which involve compression using a scheme wherein a compressed frame refers to an earlier and/or later frame, and then provides change information relative to the earlier and/or later frames. Transcoder 40 converts the uploaded movie to a series of self-referential (uncompressed) frames. Generally, a frame is a collection of picture elements (pixels) corresponding to an image presented to a human viewer.

At step 410, transcoder 40 builds a texture strip representing the movie. Specifically, transcoder 40 applies a function to each frame to generate texture data, and saves the texture data as a video image. For example, the function might be to extract the center 8.times.8 pixels of each frame and realign into a 64 pixel height column and the texture strip is the sequence of 64 pixel columns. The texture strip may be saved as a .jpg file. The texture strip serves to represent the entire movie in a convenient information bar, and is sometimes referred to as a navigation bar. The texture strip is an intuitive way of determining the temporal position of a frame relative to the entirety of a movie. The texture strip often is useful in detecting scene changes, which is important when deciding which frames to group together as a segment.

At step 420, transcoder 40 creates a source proxy for the uploaded movie. Generally, a source proxy is a representation of the frames of the movie in a particular format that is easy to convert to other formats and to distribute via public communication network 100. For example, the Flash video format, according to the H.263 standard, can be used for the source proxy.

Using a source proxy reduces the format conversion issue. Specifically, if there are n movie formats, a general transcoder should be able to convert from any input to any output format, which, by brute force, would require $n^2$ different format converters. However, using a source proxy means that only 2n format converters are needed (n converters to the source proxy format, and another n converters from the source proxy format to the output format). Additionally, as new movie formats become available, supporting them requires creating only 2 converters per format (one to the source proxy format, and one from the source proxy format), rather than 2n with the brute force approach. It is recognized that, sometimes, the source proxy format may be the desired output format.

Editing of the proxy format, also referred to as proxy editing, may occur in several ways.

In one embodiment of proxy editing, the edits are applied directly to the proxy frames.

In another embodiment of proxy editing, the proxy frames are maintained as generated, and an edit list is created, comprising edits to be sequentially applied to the proxy frames. Each time the edited movie is provided, the edits are applied anew to the proxy frames. This embodiment is particularly useful when edits need to be undone, or when many users are editing one movie to create separate edited movies.

In a further embodiment of proxy editing, a hybrid approach is used, wherein during an edit session, an edit list is created, and only at the termination of the edit session are the edits applied directly to the proxy frames.

At step 430, transcoder 40 generates a thumbnail as a visual representation of the entire movie. Typically, the user selects a frame, and transcoder 40 reduces it to a thumbnail size, such as 177.times.144 pixels. A user having many stored movies can conveniently view their thumbnails, rather than or in addition to text descriptions and/or filename descriptions.

At step 440, transcoder 40 accepts metadata from the user. Movie metadata may include a filename for the transcoded movie, subject matter keywords associated with the movie, a short text description to be associated with the thumbnail, any deep tags the user cares to define, address information such as a hyperlink of information to be associated with the transcoded movie, and an associated movie such as an audio file describing the contents of the movie.

A deep tag is a video bookmark, indicating a sequential group of frames that are to be treated as a separately addressable segment; the deep tag metadata includes the movie filename, the user filename, date of creation of the deep tag, date of most recent modification of the deep tag, a deep tag filename, the start frame, the end frame, the duration of the segment, and a short text description of the segment. A deep tag is understood to be a convenient way of identifying a segment.

FIG. 8 shows screen display 700 of player 114, provided, for example, at PC 110, and including video display 710, thumbnail 715, texture strip 720, positioner 730, deep tag marker 735, deep tag button 740, deep tag bar 750, and function buttons 760, 771, 772, 773, 775, 780 and 790. Screen display 700 is typically used by an editor.

Video display 710 shows the current frame of video. When the editor's device, such as PC 110 or phone 130 permits, the video frame is displayed in its proxy format. However, if the editor's device cannot support the proxy format, the transcoder 40 converts edited frames to an output format suitable for the editor's device prior to sending the edited frames to the editor for display.

Thumbnail 715 is a small image representing the entire movie.

Texture strip 720 comprises sequential frame representations 725 and subsequent information; each frame representation 725 is the result of the function used to create the texture strip, such as a vertical column of 64 pixels, and represents a single frame. Subsequent information indicates special effects applied to the frames and any advertising inserted in the frames.

Positioner 730 indicates where the frame display in video display 710 is located relative to the entirety of the movie. Positioner 730 enables the editor to use texture strip 720 to seek frames in the movie in a random access manner.

Deep tag marker 735 has a left edge that can be adjusted by a user, and also has a right edge that can be adjusted by the user; after the user has adjusted the left and right edges of deep tag marker 735, the user indicates that these settings should be saved as a deep tag, such as by clicking deep tag button 740, and providing a text description corresponding to the movie segment indicated by the deep tag. Deep tag marker 735 enables the editor to use texture strip 720 to select a segment of the movie.

Deep tag bar 750 is a visual representation of deep tags that have already been created for the movie. In the example of FIG. 8, deep tags 751 and 752 have previously been created for the movie, and are located near the start and end, respectively, of the movie being edited.

Function buttons 760, 771, 772, 773, 775, 780 and 790 enable the user to edit the movie. Data button 760 enables the user to view and edit metadata associated with the movie. Playback product buttons 771, 772 and 773 take the user to specialized editing interfaces, discussed below. Effects button 775 enables the user to add and edit special effects. Ad button 780 enables the user to include advertising in the movie. Sharing button 790 enables the user to grant permission to other users or user groups to view selected segments of the movie.

At step 450 of FIG. 7, transcoder 40 determines whether the user wishes to create a playback product. If so, at step 460 of FIG. 7A, the steps of FIG. 7B are executed by transcoder 40.

Turning to FIG. 7B, at step 650, transcoder 40 receives the user's selection of which playback product is to be created. For instance, using the editing interface of FIG. 8, the user indicates which playback product by selecting one of buttons 771, 772, 773. In this embodiment, three products are defined. In other embodiments, other products are available. The playback products are a mash-up, a tree, and a link-up.

A mash-up is a sequential display of selected segments. A viewer of a mash-up playback product can only navigate forward or backward in the product.

A tree is a set of segments and a hierarchical, linear control structure for displaying the segments. Generally, a viewer of a tree playback product clicks on selections to navigate the product, in addition to forward and backward.

A link-up is a set of segments and a non-linear control structure for displaying the segments. Generally, a viewer of a link-up playback product navigates via one or more of: forward and back movement, clicking on selections, and/or providing alphanumeric input. A tree and a mash-up are constrained forms of a link-up.

If a mash-up is selected, at step 655, the user selects the sequence of segments to be included via a mash-up editor. Then, at step 685, the user selects whether the mash-up is to be published or burned.

Publishing means transferring the mash-up to videobase 20 or to user PC 110. If publishing is selected, at step 690, the user selects a thumbnail to represent the mash-up, and provides metadata if desired such as a mash-up filename. At step 695, the user indicates a destination for the mash-up file, such as videobase 20, or PC 110. Transcoder 40 responds by transferring the mash-up in accordance with the user's selections.

Burning means writing the mash-up to a removable storage medium, such as a DVD or memory chip, and sending the removable storage medium to the user. If burning is selected, at step 698, transcoder 40 transfers the mash-up file to the removable storage medium type designated by the user. In the case of a DVD, transcoder 40 sends the mash-up file to DVD burner 60, which creates a DVD having the mash-up.

Figure 9A:
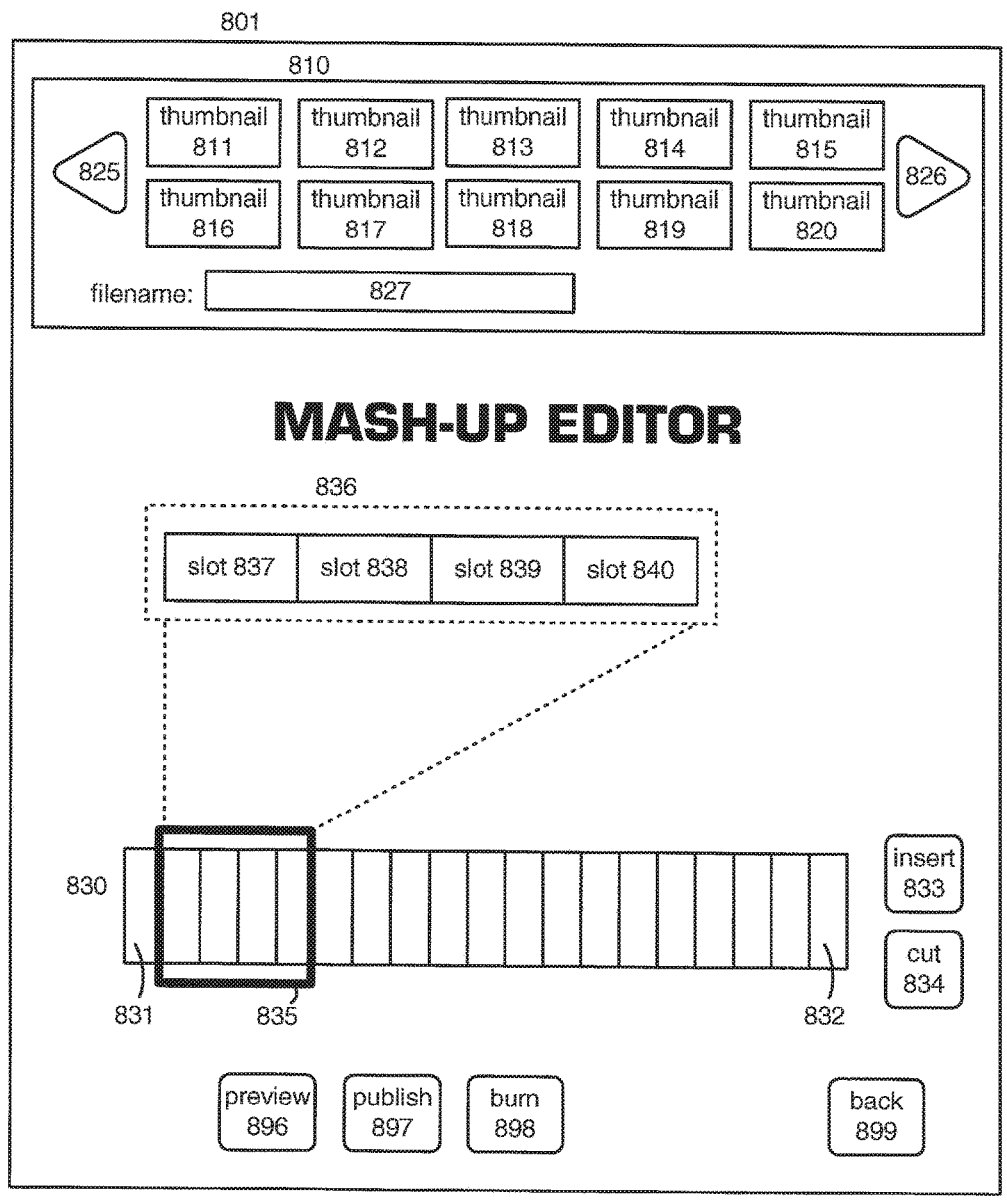
FIGS. 9A-9H are diagrams used in explaining specialized editing capabilities.

FIG. 9A shows mash-up editor interface 801. Thumbnail area 810 includes navigation buttons 825, 826 for altering which thumbnails of the user's stored thumbnails are displayed in area 810. In general, a user acquires stored files, represented by thumbnails, by uploading a movie, image, graphic or audio file; selecting frames of an existing movie; or creating a playback product as described herein. After storing a file, the user can edit the file by selecting the file's thumbnail in one of the specialized editors discussed herein. Thumbnail area 810 shows ten thumbnail windows 811-820, but a user may have hundreds of stored files, each with a corresponding thumbnail. Filename entry window 827 enables a user to type in the name of a file, or select a filename from a directory, which puts the file's thumbnail in thumbnail window 811.

Slots area 836 comprises placeholders into which the editor, also referred to as the user, drags and drops thumbnails to indicate that the thumbnails are part of the mash-up being created. Slots area 836 includes slots 837, 838, 839, 840.

Texture strip 830 represents the mash-up being created. Phantom start and end frames 831, 832 enable the user to add thumbnails before or after the selected thumbnails. Frame selector 835 has start and end portions that can be adjusted by the user. After the user is satisfied with the thumbnails dragged into slots 837-840, the user clicks insert button 833 to insert these thumbnails into the mash-up. In response, transcoder 40 creates a frame representation of each thumbnail, puts the thumbnail frame representation in the appropriate frame of texture strip 830, and clears slots 837-840. To insert subsequent files into the mash-up, the user moves frame selector 835 to a position after the inserted thumbnails. To insert preceding files into the mash-up, the user moves frame selector 835 to include phantom frame 831. To delete files from the mash-up, the user positions frame selector 835 on the frame representations of the thumbnails of the files to be deleted, and clicks cut button 834.

At any time, the user can click preview button 896 to see what the mash-up will look like. In response to preview button 896, transcoder 40 creates preview window 802, shown in FIG. 9B, having viewing area 803, and navigation button 804-807, and begins playing the mash-up in preview window 803. The user clicks back button 804 to "rewind" the playback, forward button 805 to "advance" the playback, pause button 806 to pause the playback, and stop button 807 to terminate the playback and close preview window 802.

Publish button 897 enables the user to indicate to transcoder 40 that publication of the mash-up is desired. Clicking publish button 897 causes transcoder 40 to pop-up a window (not shown) that enables the user to select a thumbnail and destination.

Burn button 898 enables the user to indicate to transcoder 40 that burning of the mash-up is desired. Clicking burn button 898 causes transcoder 40 to pop-up a window (not shown) that enables the user to select a media for burning and provide delivery directions for the burned media.

Back button 899 enables the user to return to edit window 700 in FIG. 8. If a tree playback product is selected, at step 660, the user selects the sequence of segments to be included via a tree editor, and at step 665, defines the tree structure.

Then, at step 685, the user selects whether the tree playback product is to be published or burned.

Figure 9B:
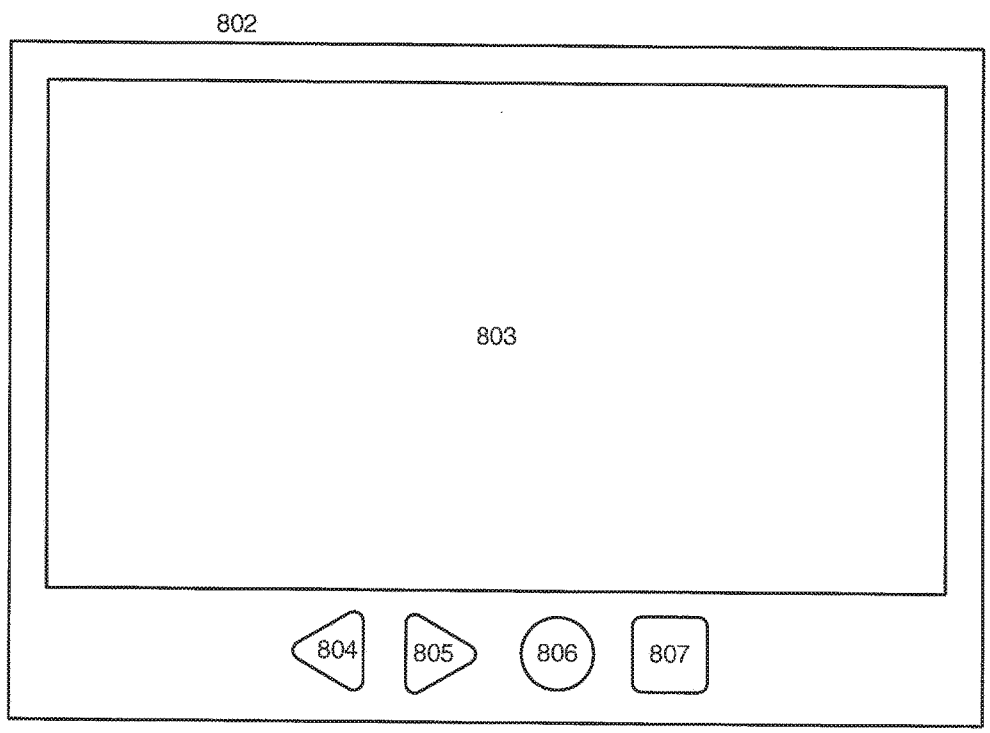
Figure 9C:
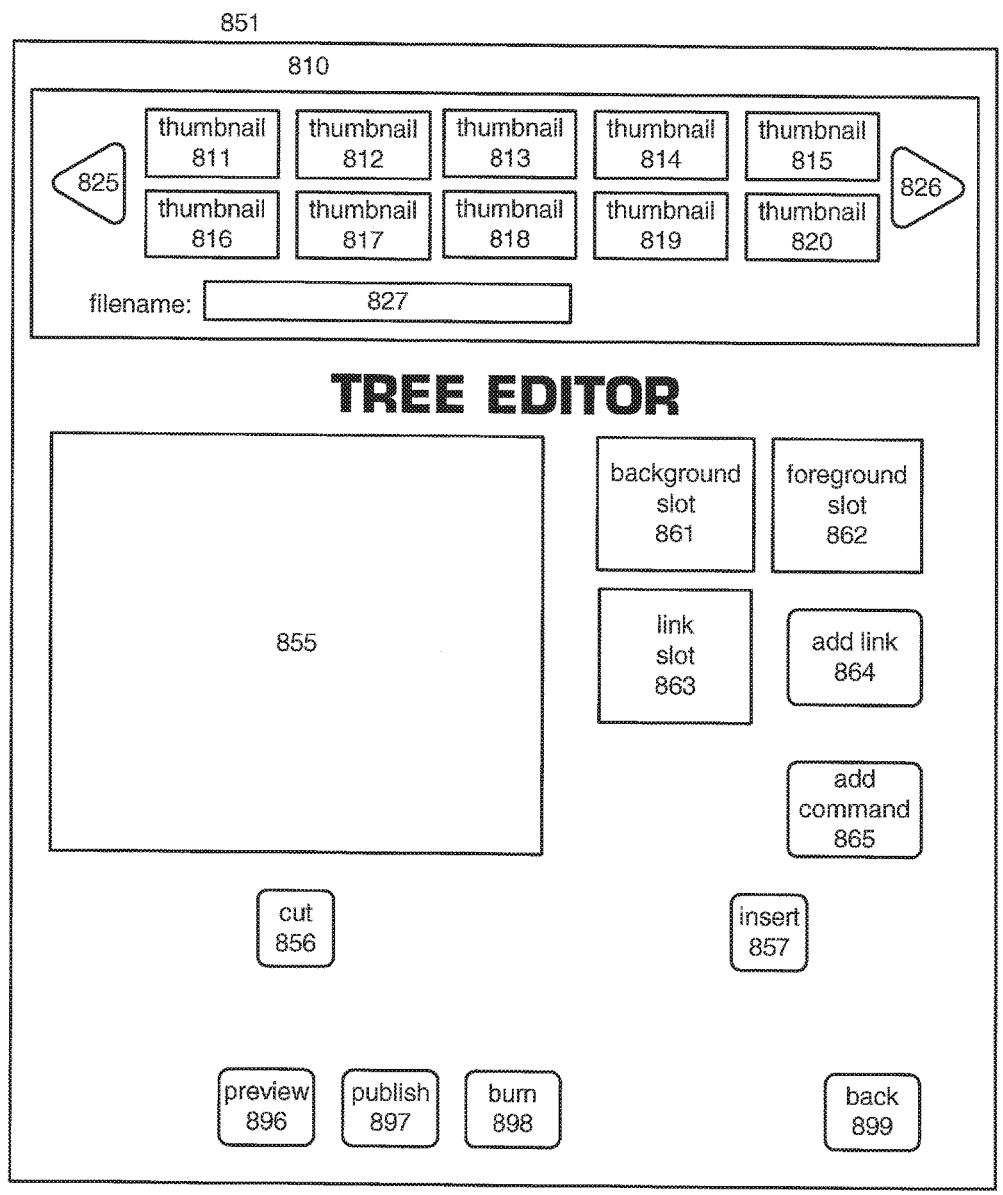

FIG. 9C shows tree editor interface 851. Tree editor interface 851 is generally similar to mash-up editor interface 801; similarities will not be discussed for brevity.

Tree structure window 855 shows a graph of the control structure of the tree playback product being created. Initially, the window is blank, since nothing has been specified.

Figure 9D:
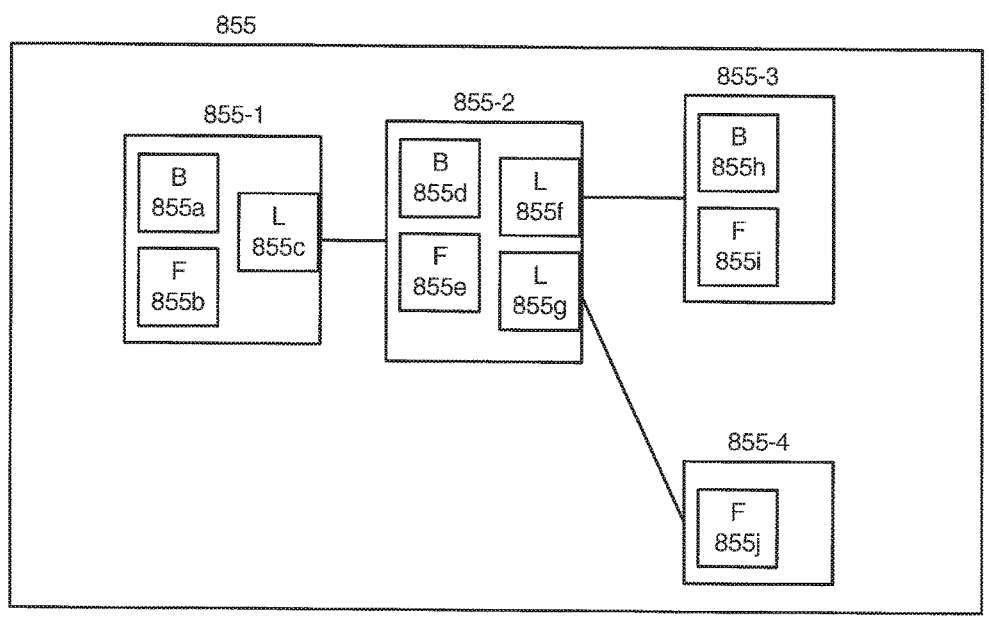

FIG. 9D shows an example of tree structure window 855 after a tree playback product has been created. The tree playback product includes segments 855-1, 855-2, 855-3 and 855-4. Window 855 shows, via lines, the control structure for the navigation between the segments of the playback product. In this example, segment 855-1 leads to segment 855-2 which in turn leads to either of segment 855-3 and 855-4.

Each segment of a tree playback product comprises a background, a foreground and a link. In one embodiment, a background is a still image, a foreground is a video or audio segment, and the link is indicated by a graphic image. When the viewer of the playback product clicks on the link, the viewer is taken to the next segment, that is, a link indicates one segment. Each segment can have 0, 1 or multiple links.

A tree segment can also include 0, 1 or multiple commands. Typically, a command is indicated by a graphic image. When the viewer of the playback product clicks on the command, the command is sent to the source of the playback product, such as server 50, for execution.

Returning to FIG. 9C, to create a segment, the editor drags and drops thumbnails from thumbnail window 810 into at least one of background slot 861, foreground slot 862, and link slot 863. If more links are desired for this segment, the editor clicks add link button 864, and then drags and drops thumbnails into the additional link slots (not shown) created by clicking link button 864. When the user is satisfied, he or she clicks insert button 857 to create a segment.

If a tree playback product segment is created with at least one link, transcoder 40 creates an empty segment as the destination of each link, and displays the empty segment in tree structure window 855. The editor clicks on the empty segment in tree structure window 855 and inserts thumbnails into at least one of the background, foreground and link slots.

If the editor wishes to delete a segment, the editor selects the segment in tree structure window 855, then clicks cut button 856 to remove the segment. Removing a segment automatically removes the link leading to the segment from the preceding segment.

To create a command in a segment, the editor clicks add command button 865. Transcoder 40 provides a pop-up window with a command editor (not shown) that enables the editor to drag and drop a thumbnail indicating the command, select a command from a menu of commands or type the command directly into a command line window (if the editor knows how to write commands in the command language, such as Javascript), and, when appropriate, provide parameters for the command. Examples of commands are: (i) a hyperlink to a webpage, (ii) provide the email address of the viewer of the playback product to the owner of the playback product, (iii) provide the email address of the viewer to a third party, (iv) download a program and execute it, and so on.

It will be understood that a thumbnail can be dropped into multiple slots during creation of a tree playback product.

Clicking preview button 896 causes transcoder 40 to create a window similar to that shown in FIG. 9B, however, the tree playback product includes link areas in window 803 that a user can click to navigate between segments.

If a link-up playback product is selected, at step 670, the user selects the sequence of segments to be included via a link-up editor. At step 675, the user defines the link-up structure. At step 680, the user defines the link-up navigation questions and answers. Then, at step 685, the user selects whether the link-up is to be published or burned.

Figure 9F:
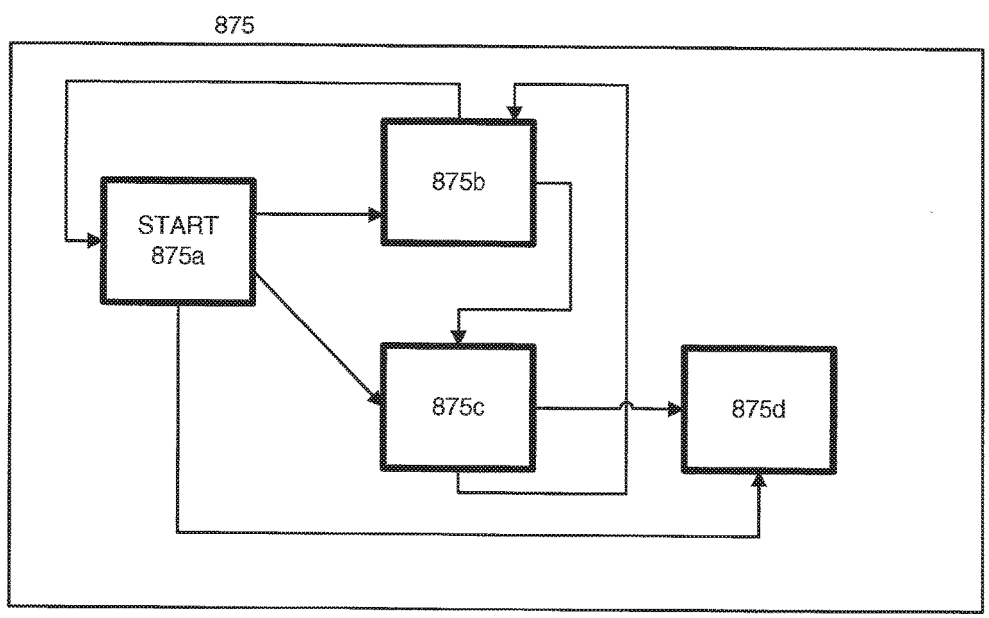
Figure 9E:
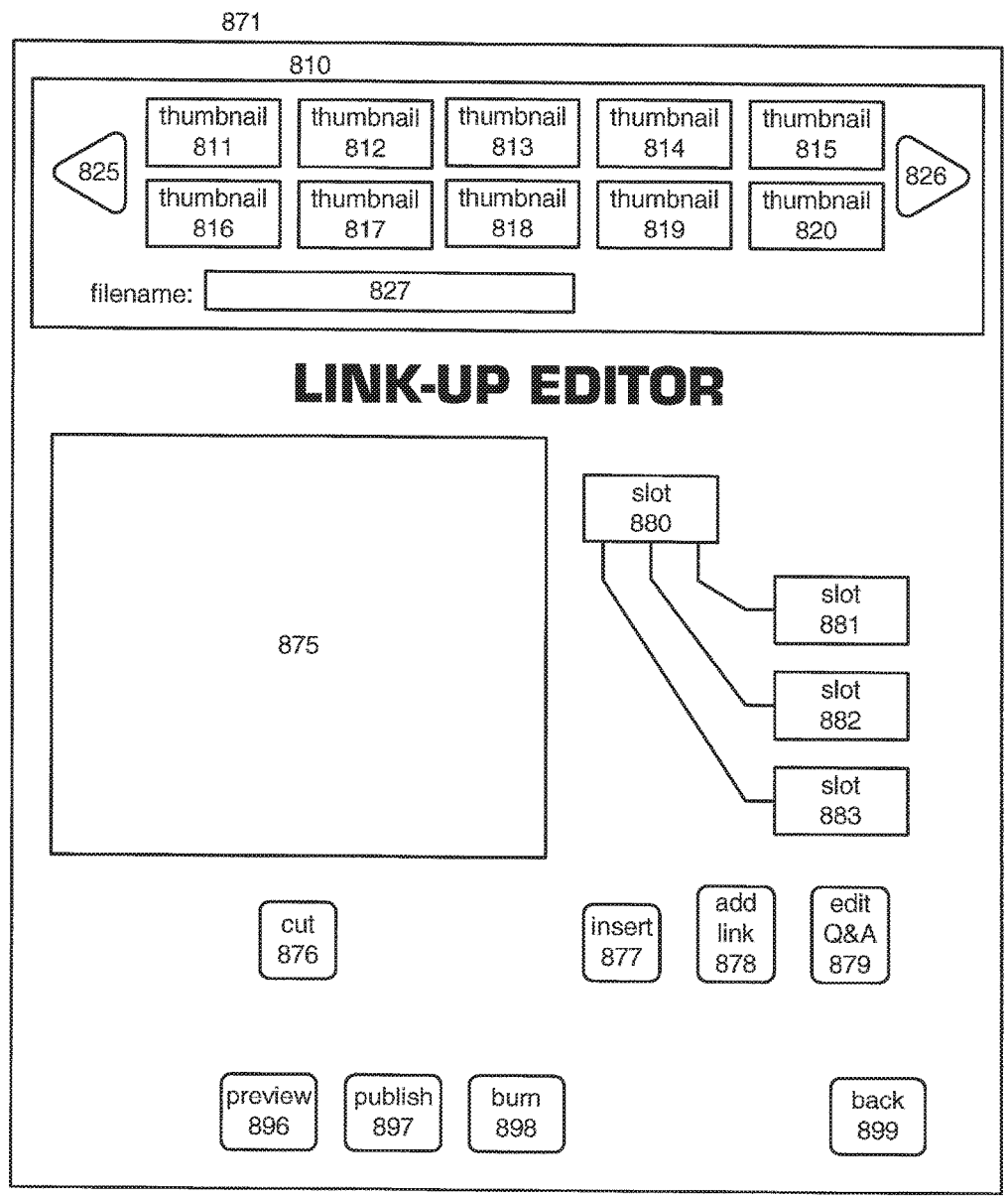

FIG. 9E shows link-up editor interface 871. Link-up editor interface 871 is generally similar to tree editor interface 851; similarities will not be discussed for brevity.

Link-up structure window 875 shows a graph of the control structure of the link-up playback product being created. Initially, the window is blank, since nothing has been specified.

FIG. 9F shows an example of link-up structure window 875 after a link-up playback product has been created. The link-up playback product includes segments 875*a*, 875*b*, 875*c* and 875*d*. Window 875 shows, via lines, the control structure for the navigation between the segments of the playback product. In this example, segment 875*a*, always the first segment to be played during playback, leads to segments 875*b*, 875*c* and 875*d*. Segment 875*b* leads to 875*a* and 875*c*. Segment 875*c* leads to segments 875*b* and 875*d*. Segment 875*d* is sometimes referred to as a final segment, since it is never followed by another segment. Segments 875*b* and 875*c* are sometimes referred to as intermediate segments, since they are not the start segment and they do lead to another segment.

Returning to FIG. 9E, to create the link-up structure, the editor drags and drops thumbnails from thumbnail window 810 into start slot 880 and at least one of intermediate slots 881, 882, 883. If more links are desired for this segment, the editor clicks add link button 878, and then drags and drops thumbnails into the additional slots created by clicking link button 878 (not shown). When the user is satisfied, he or she clicks insert button 877 to create the link-up. Transcoder 40 responds by displaying the link-up in link-up structure window 875, highlights the just-created bit of link-up structure, and freezes the highlight until the editor clicks edit Q&A button 879 to create text associated with the link-up.

A Q&A dialog (not shown), consists of an optional header and a set of choices associated with the respective links. One instance of a Q&A is, Click on the word to indicate what you want to view next:
  kitchen
  den
  basement
  garage
  backyard
 Another instance of a Q&A is,
  More pictures of actor Alice
  More pictures of actor Bob
  More pictures of actor Chris
 Another instance of a Q&A is,
  Type (or click on) the number closest to your age:
   15
   20
   25
   30

If the editor wishes to delete a segment, the editor selects the segment in link-up structure window 875, then clicks cut button 876 to remove the segment. Removing a segment automatically removes the portion of the Q&A leading to the segment from the preceding segments.

Clicking preview button 896 causes transcoder 40 to create a window similar to that shown in FIG. 9B, however, the link-up playback product includes Q&A areas in window 803 that a viewer can utilize to navigate between segments.

Returning to FIG. 7A, at step 470, transcoder 40 determines whether the user wishes to apply any special effects to the transcoded movie. For example, the user indicates a desire to apply special effects by selecting effects button 775 in FIG. 8. If so, at step 480, transcoder 40 provides the user with an effects editor (discussed below). In some embodiments, there are about 300 different effects on the effects menu. The user selects desired effects and indicates where in the movie they should be applied. At step 490, transcoder 40 applies the effects. Generally, the user views the results of the effects, and continues effects editing until satisfied with the result. The user can create multiple versions of a transcoded movie, differing in their special effects.

Examples of special effects include: watermark, mosaic, barndoor, noise, dissolve, spiral, fade in, fade out, increase contrast, decrease contrast, soften perimeter, cut frame, overlay, and so on.

A movie watermark for a movie including video is one of (a) a permanent graphic such as a logo inserted in each frame of the movie, (b) an overlay graphic such as a logo inserted in each frame of the movie, or (c) hidden information such as a logo, also referred to as steganography. A movie watermark for an audio only movie is (i) a sound file inserted at a predetermined point in the movie, such as its start or end, or (ii) hidden information such as text, also referred to as steganography.

Figure 9G:
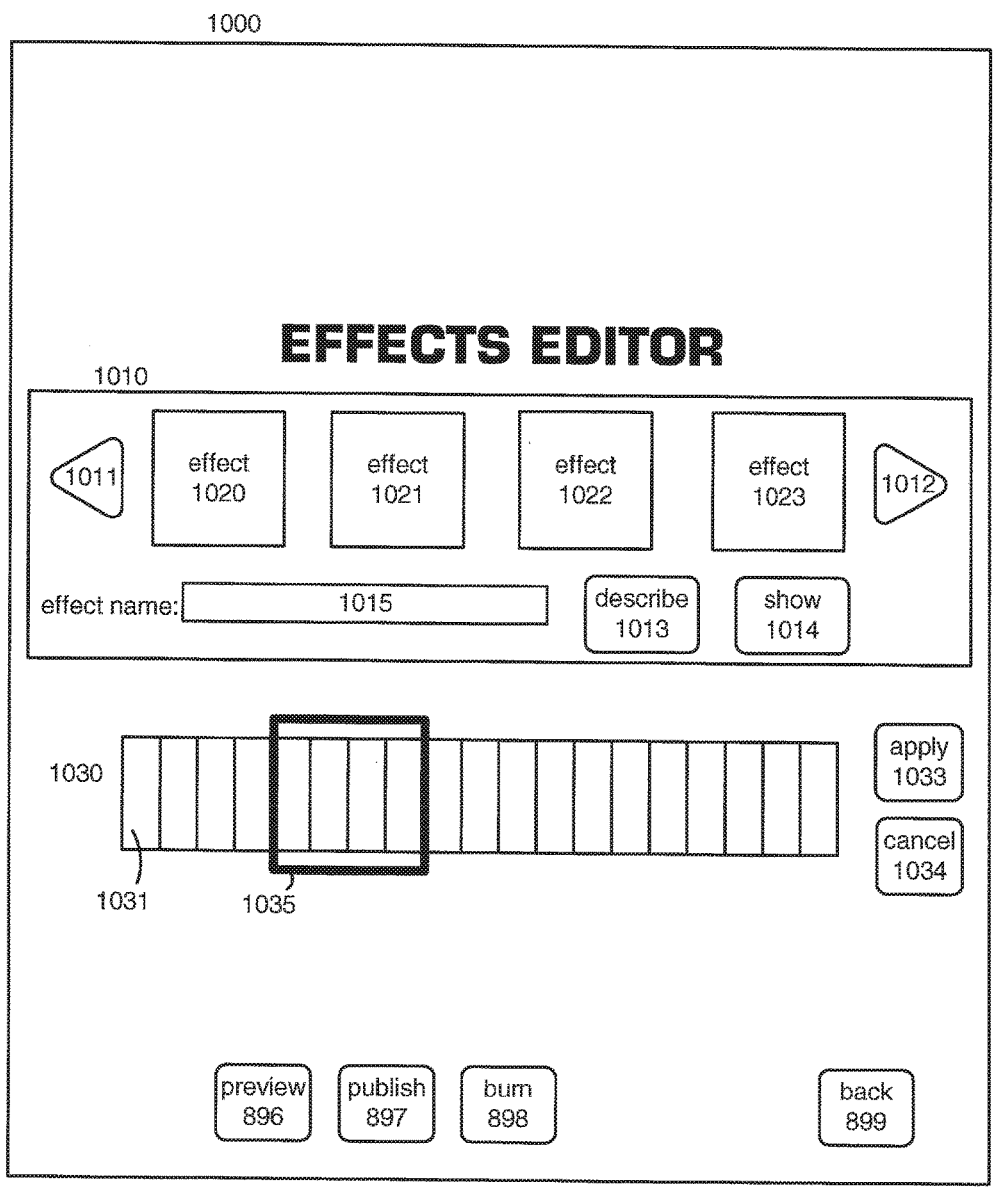

FIG. 9G shows effects editor interface 1000. Effects area 1010 includes effects buttons 1020, 1021, 1022, 1023, indicating which effect is represented by the button. Typically, an effects button has an image of the effect and holding the cursor on the button displays text describing the effect. Forward and reverse navigation buttons 1011, 1012 enable navigation among the effects buttons. Clicking describe button 1013 displays text describing the effect (same as holding the cursor on the button). Clicking show button 1014 creates a pop-up window showing the effect in action, useful when the size of the button is too small to fully convey the effect. Effect name window 1015 enables the editor to type the name of an effect or to select it from a drop-down menu.

An effect can also include an executable command, as described above with respect to the tree playback product editor.

Texture strip 1030 indicates the frame representations of the movie selected for effects, such as frame representation 1031. Slider 1035 has a left and right edge that can be adjusted by the editor, to indicate frames to receive an effect. After the editor selects an effect in effects area 1010, and adjust slider 1035, the editor clicks apply button 1033 to apply the effect. After the editor has finished applying effects, he or she clicks preview button 896 to preview. If an editor wishes to cancel an effect, she positions slider 1035 on the appropriate frame representations and clicks cancel button 1034. Publish button 897, burn button 898, and back button 899 function as described above.

Returning to FIG. 7A, at step 500, transcoder 40 obtains the user's preference for including advertising in the transcoded movie. For example, the user indicates a desire to include advertising by selecting advertising button 780 in FIG. 8. Videobase 20 contains advertising movies, also referred to as ad movies, that is, segments provided by advertisers for inclusion in user-created movies. Database 30 includes the advertiser's preference for the types of movies that the advertiser wants its ad movies to be combined with, whether the advertiser prefers or requires that its ad be used as a static insert or a dynamic insert (discussed below), whether the advertiser permits its ad movies to be used as part of a mash-up video, and how the advertiser pays the user, such as a one-time fee, or per-viewing of the ad movie. Conventional systems place advertising only at the start of user-created content; movie system 10 is more flexible in that advertising can be inserted within a user-created transcoded movie in either a static or a dynamic manner.

If the user wants to include an ad movie in the transcoded movie, at step 510, transcoder 40 determines whether the user wishes to select the ad movie, or to accept an ad movie selected by movie system 10. If the user wishes to select the ad movie, at step 520, transcoder 40 provides the user with a menu of ad movies that are consistent with the characteristics of the user's transcoded movie, and the user selects one or more ad movies for inclusion in their transcoded movie. If the user does not wish to select the ad movies, at step 530, transcoder 40 selects one or more ad movies based on an ad movie selection procedure and its own determination of how many ad movies are appropriate for the transcoded movie. In some embodiments, the ad movie selection procedure is based on maximizing revenue for the user, and following a least-recently-used ad movie selection procedure. In some embodiments, the determination of how many ad movies are appropriate is based on at least one of: the length of the transcoded movie, keywords in the metadata, how many segments are deep tagged, and the length of the deep tagged segments, and so on.

An ad used with movie system 10 can be static or dynamic. A static ad is inserted in the transcoded movie prior to its storage in videobase 20. For a dynamic ad, the transcoded movie is stored in videobase 20 with a placeholder, and when the transcoded movie is presented to a user, the actual ad is inserted, the ad being chosen based on a characteristic of the user such as the user's location, referred to as a "geo-aware" ad, the characteristics of the display device, referred to as a "device aware" ad, or other suitable characteristic.

At step 540, transcoder 40 determines whether the user wishes to control the position of the ad movie(s) within a frame of the transcoded movie, or to accept positioning determined by movie system 10. If the user wishes to control the positioning of the ad movie, at step 550, transcoder 40 provides the user with a graphical interface for controlling ad movie positioning, and a menu of how the ad-movie should be inserted, such as a picture-in-picture at the top, left, right or bottom of the transcoded movie, the top being referred to as a "banner" ad, or as a stand-alone segment in the transcoded movie. In some embodiments, transcoder 40 also provides the user with popularity statistics for portions of the movie, discussed in detail below, so that the user can position the ad in accordance with the parts of the movie that viewers like. In some embodiments, the user selects the size of the space in each frame that the ad may occupy. If the user does not wish to control the positioning of the ad movie, at step 560, transcoder 40 decides where the movie ad should be placed, typically by looking at the default position in the metadata associated with the ad movie.

At step 570, transcoder 40 determines whether the user wishes to control the frames of the transcoded movie where the ad will be placed, or to accept positioning determined by movie system 10. If the user wishes to control the positioning of the ad movie, at step 580, transcoder 40 provides the user with a graphical interface for controlling ad movie positioning, such as a texture strip and slider, and in some cases, popularity statistics (discussed below) for portions of the movie. If the user does not wish to control the positioning of the ad movie, at step 590, transcoder 40 estimates where the movie ad should be placed. Any suitable estimation procedure may be employed. As an example, if the transcoded movie is a completely new movie with no deep tags, the estimation procedure specifies that the first scene having a length of at least the length of the ad movie is the selected position, and that the ad movie should be inserted as a picture-in-picture in the lower right of the transcoded movie. However, if the transcoded movie is associated with at least one other user, then a popularity procedure is used to select the position for the ad movie.

Collection and processing of user statistics will now be discussed. These statistics are employed in the popularity procedure used to automatically position the ad movie.

Figure 10A:
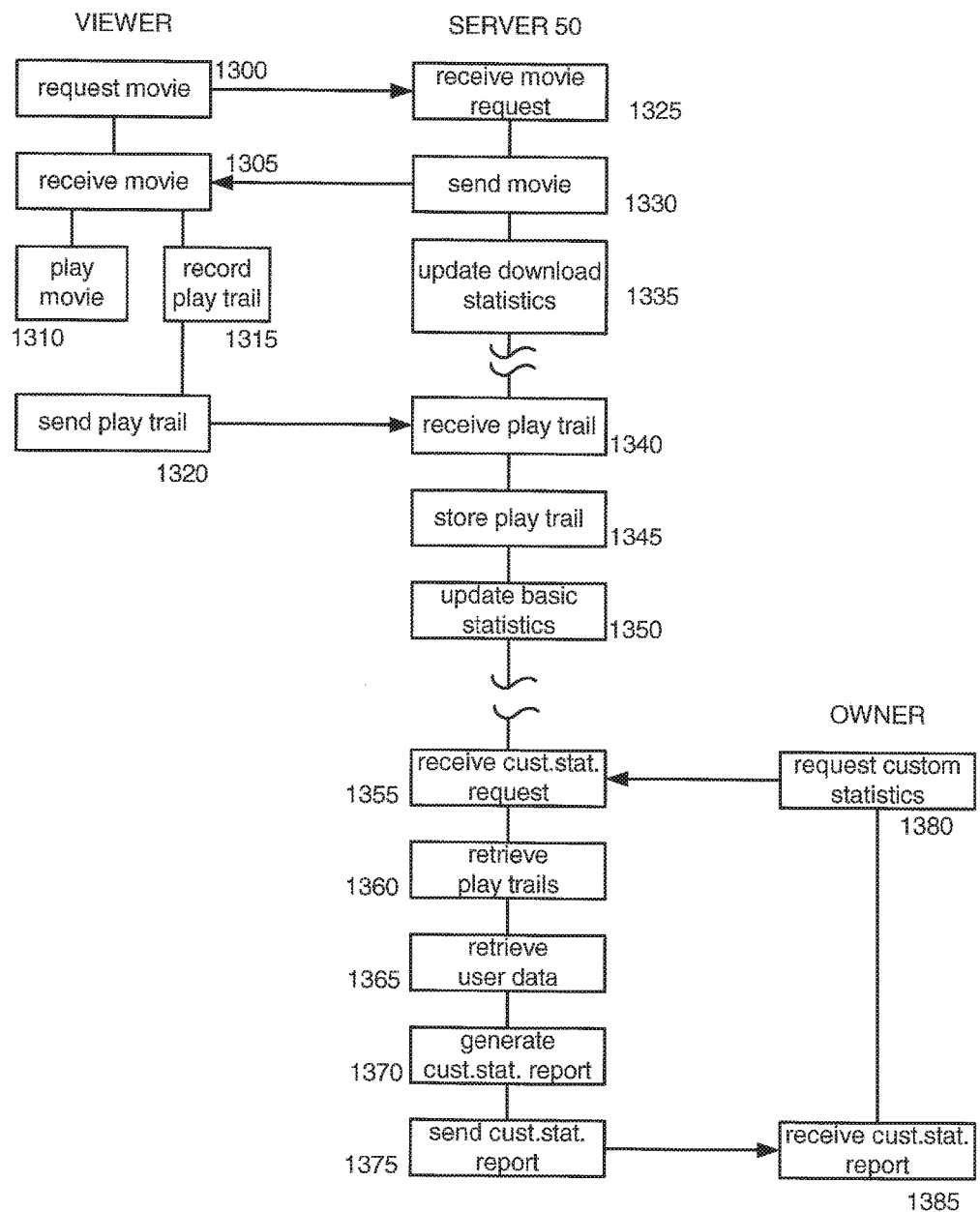
FIG. 10A is a flowchart illustrating collection and processing of usage statistics.

FIG. 10A is a flowchart illustrating collection and processing of usage statistics.

At step 1300, a viewer, such as a user of PC 140, who is understood to also or alternatively be a listener, requests a movie, such as by clicking on a link to the movie, the link being embedded in an e-mail previously sent to the viewer. At step 1325, server 50 receives the movie request, and retrieves the requested movie from videobase 20. At step 1330, server 50 sends the movie to the requesting viewer, and at step 1335, server 50 updates its download statistics for the movie.

At step 1305, the viewer receives the movie, and at step 1310 plays the movie. Playing the movie includes viewing the movie in its intended temporal sequence, pausing, replaying a section of the movie, fast-forwarding, adding one or more deep tags and so on. Meanwhile, at step 1315, a play trail is being recorded. As used herein and in the claims, a "play trail" means a timestamped sequence of actions that a viewer takes when playing a movie. The timestamp is typically measured in tenths of a second since the start of the movie, but may be measured in clock time or by frame number of the movie, or any other convenient metric. Each action in the sequence carries appropriate information to reconstruct what the viewer did, for example, "pause" indicates how long the movie was paused. When the viewer finishes viewing the movie, at step 1320, the play trail is sent to server 50.

At step 1340, server 50 receives the play trail. At step 1345, server 50 stores the play trail along with information about when the play trail was received, and the identity of the viewer, if known, or the computer address from which the play trail was sent. At step 1350, server 50 updates basic statistics for the movie. Basic statistics include, but are not limited to: number of deep tags created for a portion of a movie, access (listening and/or viewing) frequency for portions of a movie, replay frequency for portions of a movie, pause frequency for portions of a movie, and community score for portions of a movie.

As described above, a play trail is created at the user's location, then sent to server 50. In other embodiments, the play trail is stored in a so-called cookie, a locally stored data file that tracks an authenticated user's actions on a PC, on the user's PC so that the play trail data can persist over time in the cookie data even when a user's browser session has completed or has closed prematurely. The cookie can be extensive in terms of data structures and may include demographic data as well.

Alternatives to cookies include the use of HTTP authentication, client side persistence, local stored Flash objects, JavaScript window. name variables, and so on; each of these methods provides mechanisms to store and track user play trail data. The advantage of a cookie relative to a local file is that a cookie uses a standardized Internet mechanism to track user data in a well defined location on a user's hard drive. The data is tracked across user browser sessions and is persistent across those sessions. Cookies protect user privacy by tracking user behavior without tracking identity. FIG. 10C shows how a play trail can be stored as a data structure; however this same approach can be applied to the storage of data in a user cookie stored on a PC. An advantage of a cookie relative to ongoing HTTP message transmission is that the cookie minimizes network bandwidth during network playback if the cookie data is transferred after the session is complete or during periods of minimal activity when interacting with a media application.

Play trails are a form of user behavior tracking. Other user behavior that is tracked to determine popularity of a movie or movie segment includes creating a deep tag and/or sending a deep tag, such as via email, instant message (IM), message service such as SMS or MMS, or podcasting. Deep tags indicate what users consider interesting.

An email or IM version of a deep tag typically comprises a URL providing the address of the deep tag, such as www.server.com/deeptag/movieID/StartTime/EndTime, or www.server.com/movieID/deeptag/deeptagID. Additionally, the email may include text associated with the deep tag, a thumbnail image for the deep tag, and an attachment comprising the portion of the movie indicated by the deep tag. SMS, MMS and podcast versions of a transmitted deep tag are similar.

Replay frequency measures how many times a listener/viewer replays a particular portion, as opposed to its initial playing.

Pause frequency measures how many seconds that a listener/viewer pauses at a particular point in a movie.

Community score is based on ratings provided by listeners/viewers, explained below in connection with FIG. 14. The ratings can be summed, or can be normalized. A normalized score is the total number of star ratings by viewers divided by the total number of viewers. For example, a summed score of 500 might occur because 100 viewers gave a 5-star rating to a movie, or because 500 viewers gave a 1-star rating to a movie; in these examples, the normalized ratings would be 500/100=5, and 500/500=1.

While FIG. 10A shows a situation in which the entire movie is available at PC 140 and server 50 is unaware of how the user is interacting with the movie until server 50 receives the play trail, in other embodiments, server 50 is involved in some user play actions, while PC 140 attends to the remaining user play actions. For example, playback and deep tagging may be accommodated at server 50, while pause is accommodated at PC 140. In these other embodiments, server 50 collects portions of the play trail and PC 140 collects the remainder of the play trail, then PC 140 transmits its play trail information to server 50 and server 50 creates a full, combined play trail representing the viewer's actions.

Figure 10B:
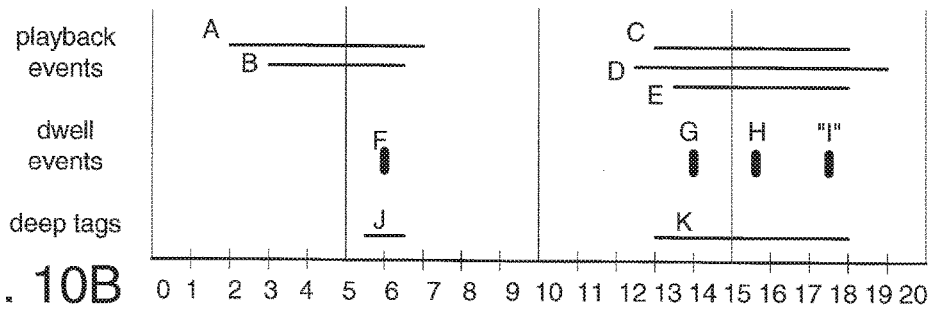
FIG. 10B is a timeline illustrating sample play events.
Figure 10C:
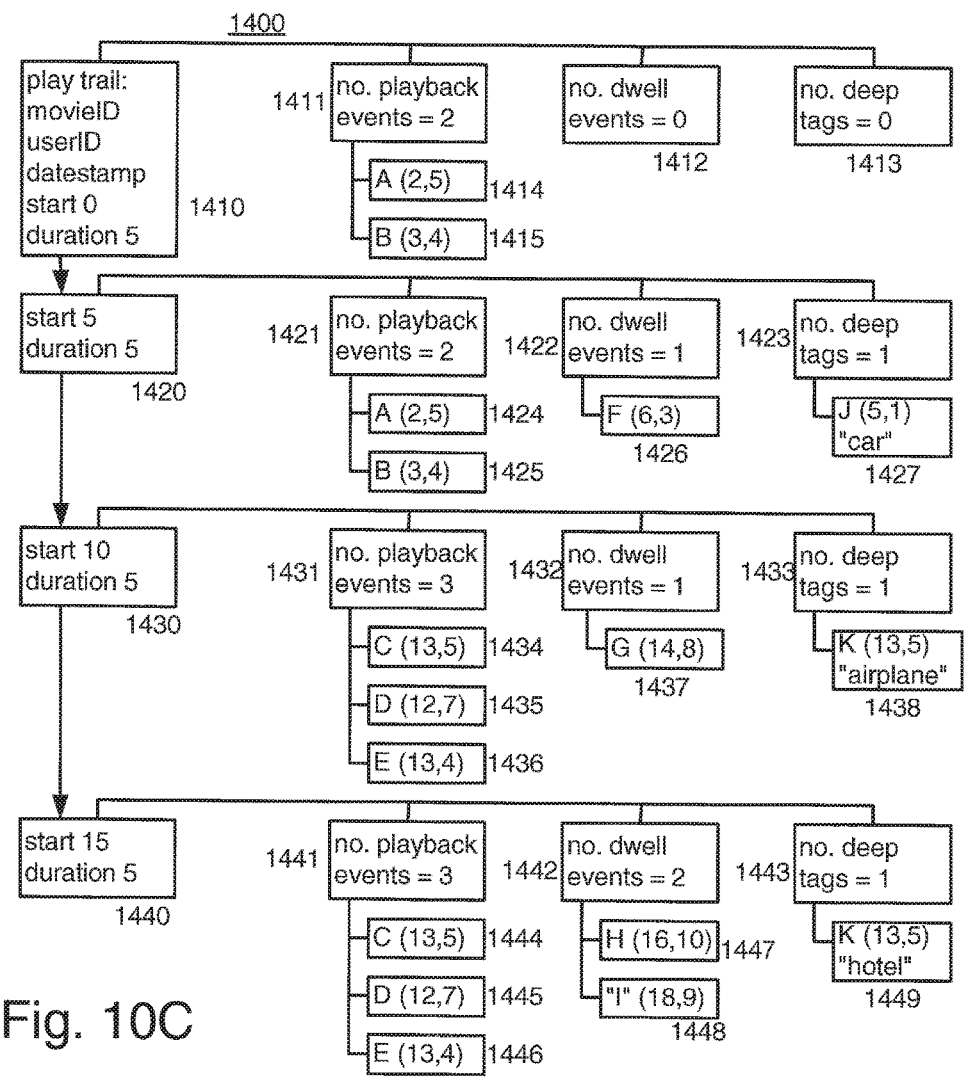
FIG. 10C is a data structure representing the sample play events of FIG. 10B.

FIG. 10B is a timeline illustrating sample play events for a particular viewer. The horizontal access indicates elapsed time in a movie, such as seconds or frames. Events A-E indicate where the viewer replayed portions of the movie. Events F-I indicate where the viewer paused the movie. Events J-K indicate deep tags created by the viewer. A movie play event corresponds to viewer actions that alter the playing sequence of a movie, that is, make the playing sequence be other than a frame by frame display with each frame being displayed for the same time interval.

FIG. 10C is a data structure representing the sample play events of FIG. 10B, that is, FIG. 10C shows play trail 1400.

In general, a play trail has a head indicating the movie ID, the user ID for the viewer, a datestamp for when the play trail was created, such as when server 50 first stored the full play trail. The head also serves as the first statistical unit. Each statistical unit points to the next sequential statistical unit corresponding to the next sequential portion of the movie. Each statistical unit also points to a triplet of event type counters: number of playback events, number of dwell events, and number of deep tags. Each event type counter also points to individual records for the events. Typically, an individual record records the start time of an event and its duration; in the case of a deep tag, text for the deep tag may also be recorded in the individual record. It will be appreciated that, when the play trail data is combined with demographic data associated with the user ID, a rich set of information is available.

In FIG. 10C, head 1410 points to statistical units 1420, 1430 and 1440, having event type counters 1411, 1412, 1413; 1421, 1422, 1423; 1431, 1432, 1433; 1441, 1442, 1443, respectively. Event A in FIG. 10B is a playback of the movie from second 2 to second 7, and is represented in FIG. 10C as a (2, 5), where 5 is the duration, i.e., 7 seconds−2 seconds=5. Event A is recorded as a playback event associated with the first statistical unit, seconds 0-5 of the movie, and with the second statistical unit, seconds 5-10 of the movie, since event A spans both statistical units. More specifically, record 1414 and record 1424 both correspond to event A. As another example, event G in FIG. 10B is seen to be a dwell event at second 14 of the movie; the corresponding record 1437 in FIG. 10C indicates a dwell event at second 14 that lasted for 8 seconds.

Figure 10D:
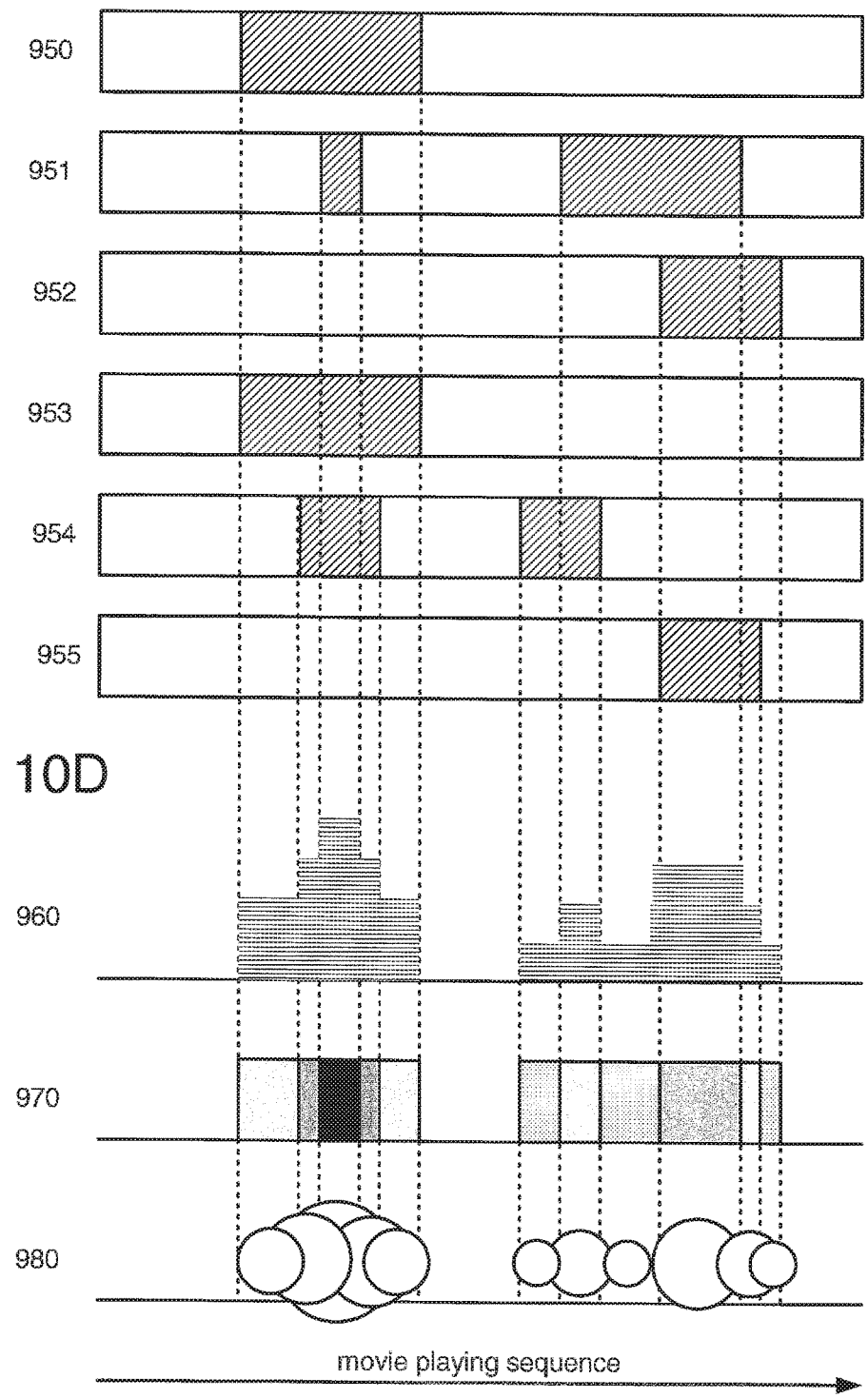
FIG. 10D is a diagram illustrating automatic determination of popular parts of a movie.

FIG. 10D is a diagram illustrating automatic determination of popular parts of a movie. Horizontal bars 950-955 represent the same movie, as deep tagged by different users. More generally, popularity can be defined as a selected metric or as a weighted combination of metrics. The metric can be one of the basic statistics, or a custom-defined statistic.

Histogram 960, also referred to as popularity density function 960, indicates the popularity metric, herein the number of times that a portion of the movie has appeared in a deep tag, which serves as an indication of the popularity of the various parts of the movie, plotted against the sequence in which the frames of the movie are displayed.

Color graph 970 uses different colors to represent different levels of popularity. In one scheme, the most popular portions of a movie are indicated by red areas, while the least popular portions of a movie are indicated by blue areas. In another scheme, different shades of gray are used to indicate popularity.

Color graph 970 can be generated as follows. Let the metric being plotted be the Total Interest in a specific part of the movie. The Total Interest metric is an indicator of the level of popularity of a section of a movie. The Total Interest is a weighted combination of metrics, such as the amount of time paused, the number of playbacks, or the number of deep tags created in a specific section of a movie. First, the metric is normalized to be a value between 0-100. Next, the normalized metric is mapped to the 0-255 code for each of the display colors of blue, green, and red.

As a specific example, let the metric plotted be the number of playback events per unit time for a movie, and assume the maximum number of playback events for any segment of a video is 25, so that 25 playback events is normalized to a value of 100. The color code is calculated using the following formula:

Red=(MAX(((Normalized_Metric−50)*255/50)),0))

Blue=(MAX(((50−Normalized_Metric)*255/50), 0))

For: Normalized_Metric<=50:Green=(Normalized_Metric*255/50)

Else: Green=((100−Normalized_Metric)*255/50)

Sample usage statistics for a particular movie, and their conversion to RGB values are shown in the following table.

| Movie segment | No. playback events | Normalized value | Red | Blue | Green |
|---|---|---|---|---|---|
| 0 to 5 sec | 5 | 20 | 0 | 153 | 102 |
| 5 to 10 sec | 10 | 40 | 0 | 51 | 51 |
| 10 to 15 sec | 0 | 0 | 0 | 255 | 0 |
| 15 to 20 sec | 25 | 100 | 255 | 0 | 0 |

The Red Green Blue color values determine the color for a vertical column of pixels in color graph 970 corresponding to the time interval of the movie segment. As is well-known, each pixel of a display can actually be a group of three light emitting elements: red, green and blue, and the intensity values for each of the elements determine the color perceived by the viewer. In some embodiments, the columns of color graph 970 are placed next to each other, like bar graphs having the same height, whereas in other embodiments, the colors are interpolated from column to column, to provide a more aesthetically pleasing appearance.

Cloud graph 980 has clouds or circles whose size corresponds to the popularity of a movie portion.

Other types of graphical representations of popularity may be employed, such as three dimensional strips with colored segments, three dimensional bar graphs, surface contour maps in three dimensions, and so on.

As used herein and in the claims, popularity statistics are based on one or more popularity metrics such as total number of requests for a movie, total number of times that the movie has been selected as a favorite (see FIG. 14), total number of times that the movie has been given a three, four or five star rating (see FIG. 14), number of times that a portion of the movie has been played back, number of times that a portion of a movie has been paused by a viewer, total pause time for a portion of a movie, number of times that a viewer has placed a deep tag on a portion of the movie, number of deep tag transmissions relating to the movie, and so on.

A further aspect of the movie may be provided by demographic or other selected data about viewers, such as age bracket, gender, location, income level and so on, instead of or in addition to the popularity metrics discussed above. Of course, this can be accomplished only when the viewer provides such demographic data, such as during establishing a new user account.

Popularity graphs can be reported to the owner of the movie.

Figure 14:
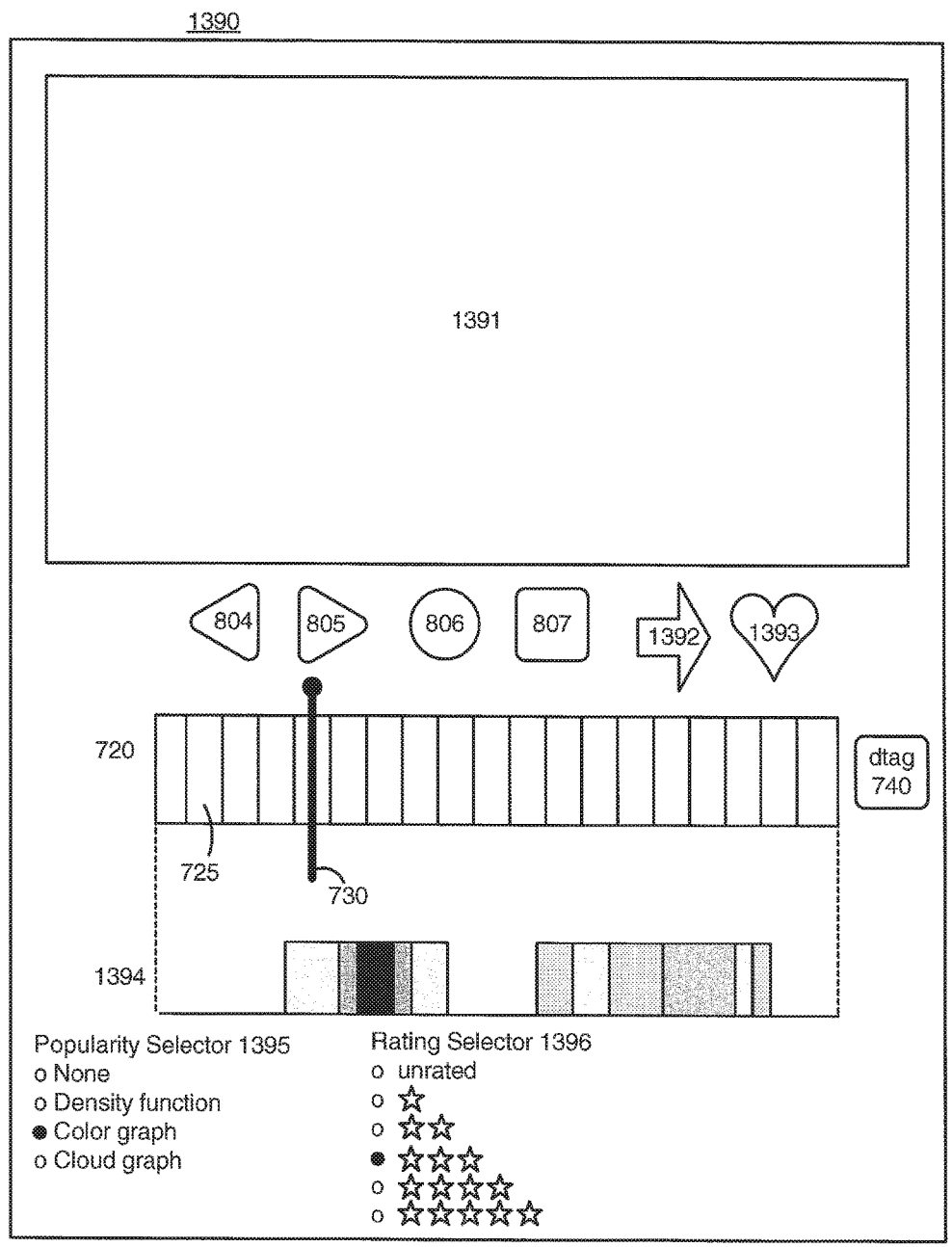
FIG. 14 is a diagram of a user interface for playing a movie.

As shown in FIG. 14, popularity graphs can be displayed to a viewer of the movie.

Popularity graphs can also be used internally by transcoder 40. Movie ads are placed in the popular parts, if they are long enough, or with respect to the popular parts, if the popular parts are shorter than the ad movie. For example, the movie ad could be placed so that its start is co-located with the start of a popular segment having a duration of at least 70% of the duration of the ad movie.

Returning to FIG. 10A, generation of a custom statistics report, also referred to as a custom popularity report, will now be discussed.

At step 1380, an owner of a movie requests custom statistics about the movie, such as a number of deep tags created by a particular demographic group during a particular time period. At step 1355, server 50 receives the custom statistics request. At step 1360, server 50 retrieves appropriate play trails, and at step 1365, server 50 retrieves appropriate user data. At step 1370, server 50 generates the requested custom statistics report. At step 1375, server 50 sends the custom statistics report to the requester. At step 1385, the requester receives the custom statistics report.

At step 600 of FIG. 7A, transcoder 40 inserts the selected movie ads into the transcoded movie.

Figure 10E:
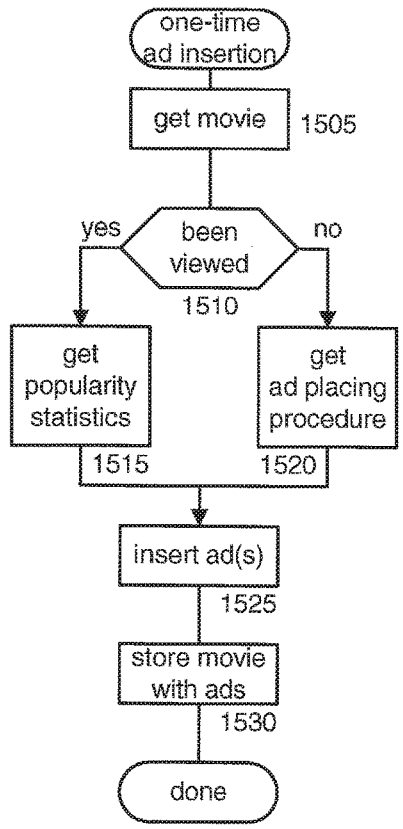
FIGS. 10E-10G are flowcharts illustrating different techniques for using popularity statistics to insert ads in a movie.
Figure 10G:
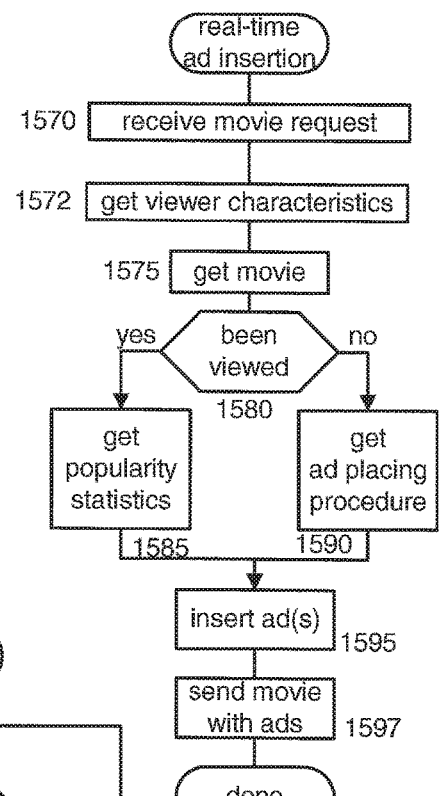
Figure 10F:
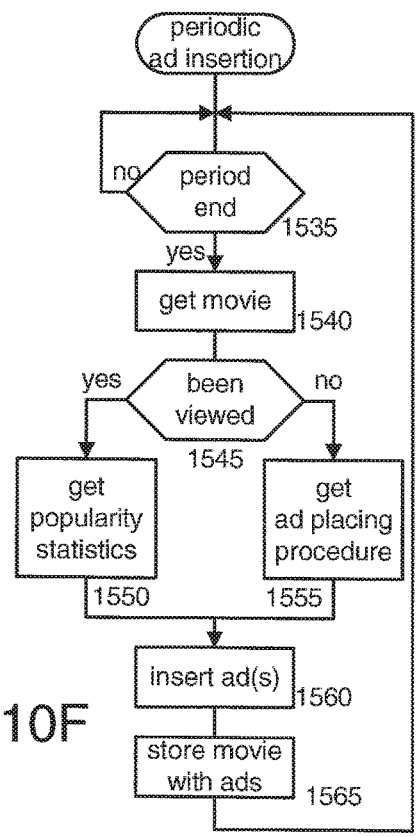

FIGS. 10E-10G are flowcharts illustrating different techniques for using popularity statistics to insert ads in a movie. FIG. 10E shows a one-time ad insertion procedure. FIG. 10F shows a periodic ad insertion procedure. FIG. 10G shows a real-time, dynamic, "on the fly" ad insertion procedure.

FIG. 10E shows the technique just described, wherein transcoder 40 inserts ads into a movie. At step 1505, transcoder 40 obtains the movie, such as because the movie is being edited. At step 1510, transcoder 40 determines whether the movie has been viewed.

If the movie has been previously viewed, at step 1515, transcoder 40 obtains movie characteristics and popularity statistics for the movie, such as popularity density graph 960, color graph 970, cloud graph 980, or a computed metric such as Total Interest, discussed above as a weighted sum of various play events. Transcoder 40 also obtains the placement rules for an ad. Typically, an ad provider specifies default placement rules when their account is set up, and can modify, or override for a particular ad or movie, these default placement rules as they wish. Default ad provider placement rules specify whether an ad must be placed manually or automatically, by transcoder 40. If automatically, the ad provider placement rules are able to further specify whether the ad should be aligned with the start of a popular portion, be centered on a popular portion, be aligned with the end of a popular portion, be placed in the popular portion of closest duration to the ad, or other placement procedure. The duration of the ad and the duration of the movie may or may not be identical. The ad provider placement rules are also able to specify whether the ad provider requires the most popular portion of the movie, or will accept another portion that is still popular, such as by indicating how much of a premium the ad provider is willing to pay. In some embodiments, for aesthetic reasons, transcoder 40 generally ensures that there is only one movie ad in any portion of a movie.

On the other hand, if the movie has never been viewed, which in some embodiments corresponds to the number of views being below a threshold, then transcoder 40 uses a predefined procedure based on movie characteristics to place ads. Instances of a predefined procedure for ad placement include: (i) to place ads so they are uniformly distributed in time throughout the video, (ii) clustering ads into groups between movie portions of two to three minutes duration, permitting four to six ads to be inserted for every eight to ten minutes of movie content, as is done in broadcast television, (iii) to place ads at scene changes in the movie, (iv) to place ads at mid-scene in the movie, and so on. In some embodiments, for aesthetic reasons, transcoder 40 generally ensures that there is only one movie ad in any portion of a movie.

At step 1525, transcoder 40 places an ad in the movie, with the placement determined either by popularity statistics or the predefined procedure. At step 1530, transcoder 40 stores the movie with ad(s) in videobase 20.

FIG. 10F is similar to FIG. 10E, except that in FIG. 10F, a timer constantly runs and at a specified period, such as every hour, every day, every week, or other appropriate period, at step 1535, transcoder 40 redetermines the position of the ad in the movie.

FIG. 10G shows real-time ad insertion. At step 1570, a potential viewer requests a movie. At step 1572, transcoder 40 gets the characteristics of the viewer, if possible. For example, when a user registers with movie system 10, the user can specify their demographics; if the potential viewer is a registered user, then their demographics are available. At step 1575, transcoder 40 obtains the movie, and as described above, inserts ads using either popularity statistics or a predefined ad insertion procedure; here, the characteristics of the viewer may also be used to determine what ad(s) to place in the movie. At step 1597, transcoder 40 sends the movie to the viewer.

Other procedures may be used to automatically insert an ad into a movie, instead of or in combination with the techniques described above.

Motion analysis of a movie may be used to determine where to place an ad, for example, in a scene having the least amount of motion, or alternatively in a scene having a lot of motion but in a relatively static area of the high motion scene. Motion analysis ensures that ad placement is complementary to activity in the movie, rather than obliterating it. For example, some advertisers may specify that their ad should be placed so that it does not interfere or intersect with dramatic scene changes or scenes of high interest with primary characters visible in the scene.

Face analysis of a movie may be used to ensure that an ad is not placed over a face and/or to ensure that an ad is placed in a scene with at least one human face. Advertiser business rules may indicate a preference for ad placement near faces (i.e., just above or below) so that they do not obscure any characters but are assured that their advertisement will be in an important scene.

Image analysis of a movie may be used to ensure that text or logos are not obscured by an ad. Alternatively, it may be desirable to obscure a logo in the movie with an ad.

Examples of products that perform object recognition and face detection on a video stream are:

Autonomy Virage Smart Encode, available at http://www.virage.com/content/products/vs_smartencode/index.html, and Intel Open Source Computer Vision tools, available at http://www.intel.com/research/mrl/research/opencv/

Figure 9H:
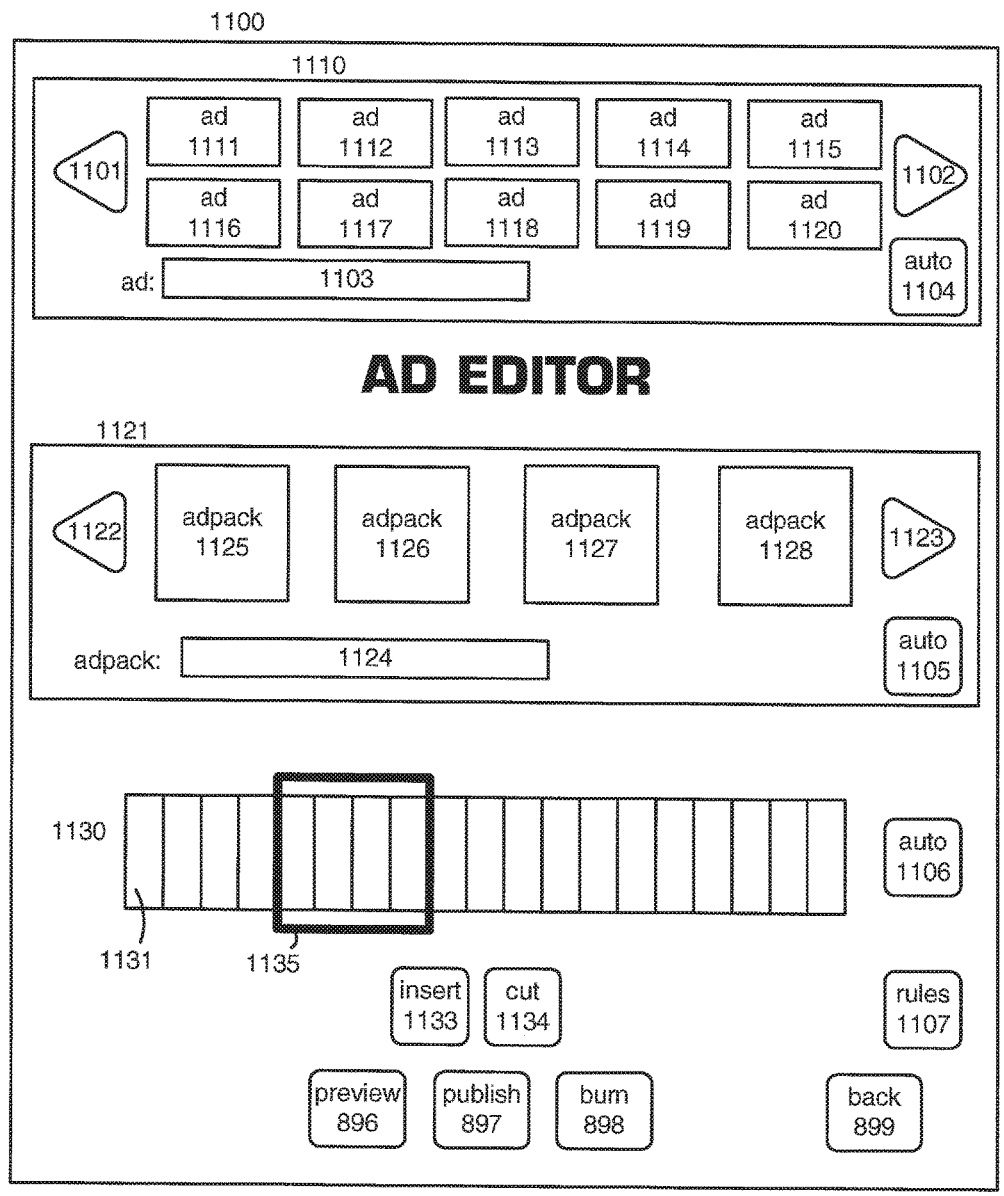

FIG. 9H shows ad editor interface 1100 having ad area 1110, adpack area 1121 and texture strip 1130.

Ad area 1110 includes ad thumbnail windows 1111-1120 and navigation buttons 1101, 1102 for altering which thumbnails of the ad thumbnails in videobase 20 are displayed in area 1110. Filename entry window 1103 enables a user to type in the name of an ad file, or select an ad filename from a directory, which puts the file's thumbnail in ad thumbnail window 1111. Ad area 1110 also includes automatic button 1104, for indicating that movie system 10 should select an ad.

An adpack is a pairing of an ad movie and an adpack description. An adpack description controls how the ad movie will be displayed in the transcoded movie. Examples of adpack descriptions are:

Ad image at frame bottom

Ad image at frame bottom, fade in and fade out

Ad image slides from left to right in succeeding frames

Ad audio plays when frames are viewed
Ad video at frame top
Ad video at frame bottom
Ad video in frame left
Ad video in frame right The International Advertising Bureau has defined standard ad display areas, and these may be used as adpack descriptions; see, for example, http://www.iab.net/standards/popup/index.asp.

An adpack can also include one or more executable commands, as described above with respect to the tree playback product editor. The provider of an ad movie typically specifies certain adpacks as selectable for its ad movie, and configures the commands to be associated with its ad movie. Examples of commands are: (i) a hyperlink to the ad provider's web site, (ii) sending the email address of the viewer of the transcoded movie to the ad provider, and (iii) requesting a file download from the ad provider to the viewer of the transcoded movie; other commands are also contemplated.

Adpack area 1121 includes adpack description windows 1125-1128 and navigation buttons 1122, 1123 for altering which adpack descriptions are displayed in area 1121. Filename entry window 1124 enables a user to type in the name of an adpack, or select an adpack from a directory, which puts the adpack in adpack description window 1125. Adpack area 1121 also includes automatic button 1105, for indicating that movie system 10 should select the placement of the ad in the frame.

Texture strip 1130 includes frame representations of the movie being edited, such as frame representation 1131. Slider 1135 indicates frame representations in the texture strip; the editor can adjust the left and right edges of slider 1135. Automatic button 1106 is used when the editor wishes to indicate that movie system 10 should select the frames in which the ad is placed.

To manually insert an ad, the editor selects an ad, such as by clicking ad thumbnail 1117, then selects an adpack description to control where in the frame the ad is placed, such as by clicking adpack description 1127, then adjusts slider 1135 to indicate which frames the ad is placed in, then clicks insert button 1133.

To instruct movie system 10 to select an ad and put it in the movie being edited, the editor clicks automatic buttons 1104, 1105 and 1106.

Rules button 1107 enables the editor to specify the advertiser's ad placement preferences. Advertiser preferences can specify movie characteristics, movie popularity characteristics, viewer characteristics, and how much the advertiser is willing to pay depending on the combination of features delivered, which may include whether the ad is viewed or whether the viewer takes an action relating to the ad. For example, some ads include hyperlinks that a viewer can click on, and the advertiser may be willing to pay a first rate if the ad is merely presented to the viewer, and a second rate if the viewer clicks on the hyperlink. Clicking rules button 1107 makes another window (not shown) appear, that guides the editor through specifying the advertiser preferences. In some embodiments, when an advertiser first registers with movie system 10, the advertiser specifies their default preferences; in these embodiments, the window (not shown) has the defaults filled in, and enables the editor to override the defaults.

To remove an ad, the editor adjust slider 1135 then clicks cut button 1134.

Buttons 896, 897, 898, 899 function as described above.

Returning to FIG. 7A, at step 610, transcoder 40 determines whether the user wishes to share the transcoded movie, or segments thereof. For example, the user indicates a desire to share by selecting share button 790 in FIG. 8. If so, at step 620, the user identifies segments by deep tagging them, or using previously defined deep tags. At step 630, the user identifies who is permitted to access which segments. In some embodiments, when a user registers with movie system 10, the user can create access groups having one or more outside users in each group; the same outside user can be included in one or more access groups. An outside user is generally identified by a nickname and an email address. Then, the user instructs transcoder 40 when to make the access permissions effective, typically by sending an email to the outside users identifying the segment address, and its short text description. The segment address is of the form: (server 50 address, transcoded movie identifier, deep tag identifier). In some embodiments, the user can, as part of sharing, list the transcoded movie in a directory accessible to other users of movie system 10, searchable by characteristics of the transcoded movie, such as its metadata subject keywords, its creation time, and/or its ads.

Figure 11:
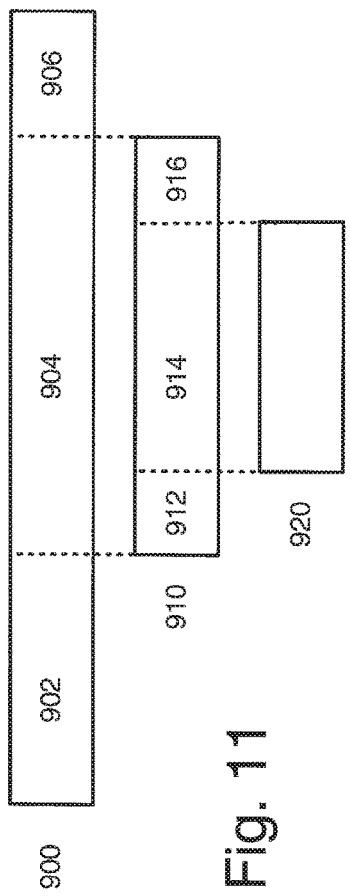
FIG. 11 is a diagram illustrating access permission for a movie.

FIG. 11 is a diagram illustrating access permission for a movie. Let it be assumed that the owner of movie 900, user1, defines a deep tag indicating segment 904 of movie 900, and permits an outside user, user2, to access segment 904. Now, in movie 900, segments 902 and 906 are private segments, while segment 904 is a shared segment.

User2 sees segment 904 as movie 910. User2 can define a deep tag indicating segment 914 of movie 910, and permit an outside user, user3, to access segment 914. Now, in movie 910, segments 912 and 916 are private to user2, while segment 914 is shared.

User3 sees segment 914 as movie 920, and can similarly enable access to all or parts of movie 920.

The transcoded movie is then stored in videobase 20, and database 30 is suitably updated.

A use case will now be discussed.

Let it be assumed that a user uploads three files (FIG. 7, step 400). The first file can be a DVD file in MPEG2 format. The second file can be a webcam file in MPEG4 format. The third file can be a mobile phone camera recording in 3GP format. At this time, the MPEG2, MPEG4 and 3GP formats are considered incompatible.

Movie system 10 converts each of these three files to proxy files in H.263 Flash format (FIG. 7, step 420). Let it be assumed that each of the proxy files has 100 frames, and have the filenames:
Proxy-1200
Proxy-1201
Proxy-1202

Now the user creates a mash-up (FIG. 7, step 450) using the mash-up editor (FIG. 9A). Transcoder 40 represents the mash-up as a list of the proxy files and the start and end frames of each proxy file:
Proxy-1200, start 22, end 27
Proxy-1201, start 84, end 86
Proxy-1202, start 62, end 70

Next, the user adds special effects (FIG. 7, step 480) using the effects editor (FIG. 9G). Let it be assumed that one special effect is a watermark (effect 45) comprising an image in the user's file proxy-678, and another special effect is a dissolve (effect 18) between the seventh to ninth frames of the mash-up. Transcoder 40 represents the result as:
Proxy-1200, start 22, end 27
Proxy-1201, start 84, end 86
Proxy-1202, start 62, end 70

Effect 45, proxy-678
Effect 18, start 7, end 9

Finally, the user inserts two ads, allowing the system to automatically choose the ads and their placement (FIG. 7, steps 530, 560, 590) using the ad editor (FIG. 9H). Transcoder 40 represents the result as:

Proxy-1200, start 22, end 27
Proxy-1201, start 84, end 86
Proxy-1202, start 62, end 70
Effect 45, proxy-678
Effect 18, start 7, end 9
Ad 4511268, adpack 2, start 3, end 6
Ad 3897522, adpack 163, start 11, end 16

Figure 12:
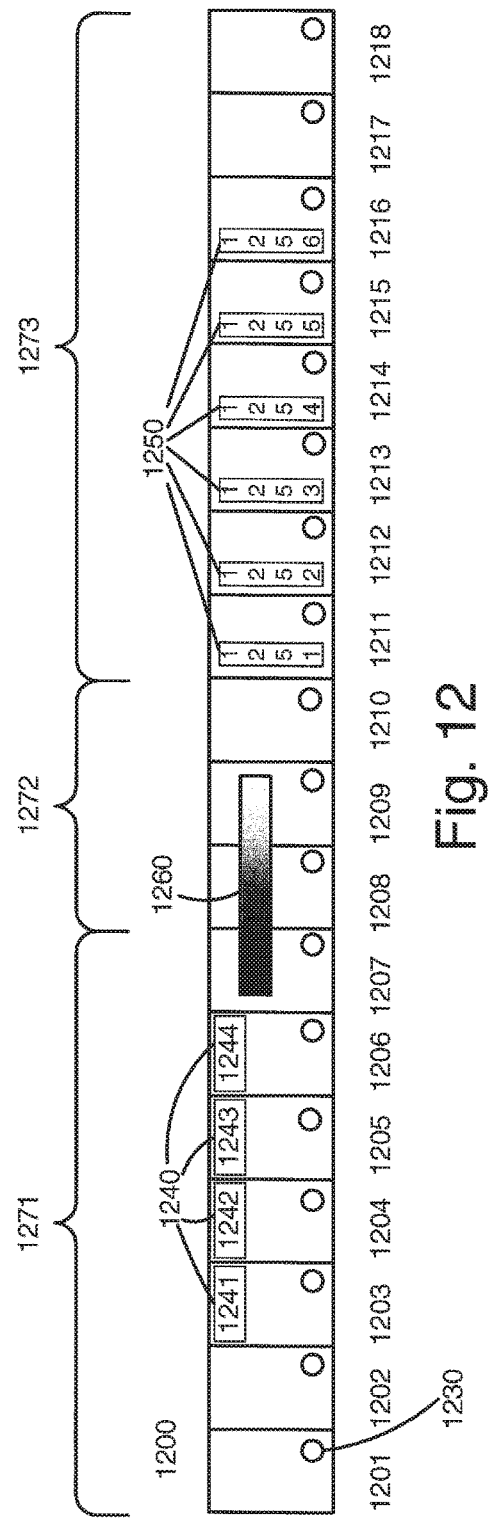
FIG. 12 is a diagram illustrating a transcoded movie.

FIG. 12 shows the texture strip resulting from this use case. Texture strip 1200 comprises frame representations 1201-1218. As indicated by bracket 1271, frame representations 1201-1207 are from file Proxy-1200. As indicated by bracket 1272, frame representations 1208-1210 are from file Proxy-1201. As indicated by bracket 1273, frame representations 1211-1218 are from file Proxy-1202. Watermark 1230, the logo in file proxy-678, is present in the bottom right of each frame, as depicted in each of the frame representations. Dissolve special effect 1260 is present in frame representations 1207-1209. First ad 1240, having frame representations 1241-1244, in present as a top banner in frames 1203-1206. Second ad 1250, having frame representations 1251-1256, is present as a side banner in frames 1211-1216.

It will be appreciated that some editing functions can be accomplished in several ways. For example, if the user wishes to delete a frame from the movie, this can be accomplished via (1) creating a mash-up comprising the frames before the deleted frame, followed by the frames after the deleted frame, and not including the deleted frame; (2) adding a special effect to cause the deleted frame to be entirely dark or entirely light, as part of a scene transition; (3) directly selecting "delete frame" from the special effects menu; (3) enabling sharing of the entirety of the movie except for the to-be-deleted frame; and so on.

Figure 13:
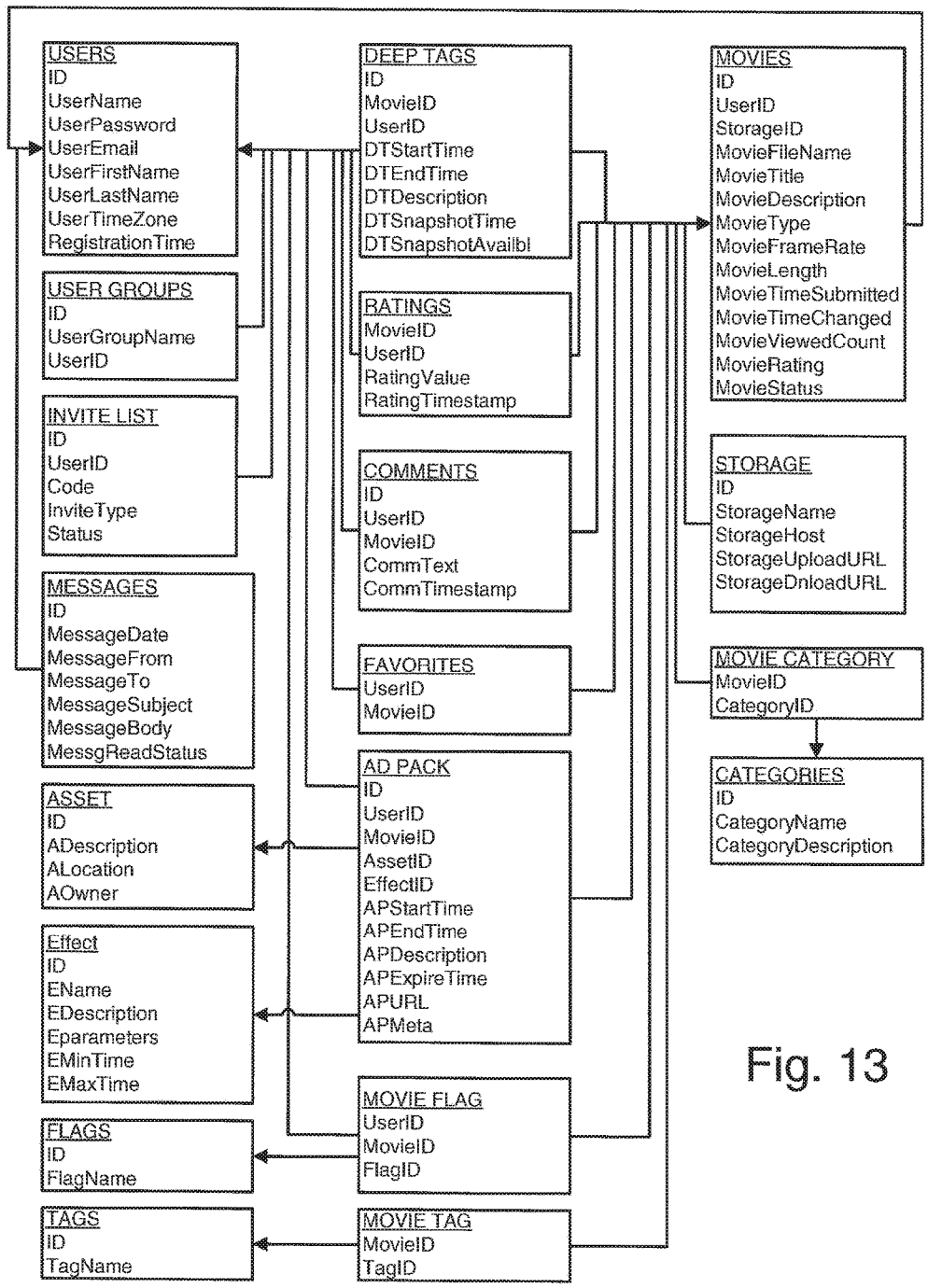
FIG. 13 is a data schema used in the invention.

FIG. 13 is a partial data schema for database 30. Generally, database 30 can be viewed by users or by movies having appropriate access permission. The schema is structured in accordance with usage of movie system 10.

FIG. 14 shows screen display 1390, provided, for example, at PC 140 or phone 130, and including video display 1391, texture strip 720, deep tag button 740, positioner 730, navigation buttons 804-807. send button 1392, favorites button 1393, popularity selector 1395, rating selector 1396 and graph area 1394. Screen display 1390 is typically used by a listener/viewer of a movie.

Elements 720, 730, 740 and 804-807 function as described above; the description will not be repeated here for brevity.

Send button 1392 is used to email a hyperlink of the movie to an email account. Clicking on send button 1392 causes a window to pop-up for entry of an email address. The pop-up window may have a drop down menu of previously used email addresses arranged by frequency of use, or alphabetical order and so on. In some embodiments, the window enables provision of a text message accompanying the hyperlink.

Favorites button 1393 is used to add the movie to the viewer's list of favorite movies maintained by the player for the user.

Popularity selector 1395 enables the user to control display of a popularity graph, as explained above with regard to FIG. 10. Popularity selector 1395 comprises a set of so-called radio buttons, from which one button can be selected. Selecting "None" suppresses display of a popularity graph. In FIG. 14, "Color graph" is selected, and so color graph 970 of FIG. 10, as appropriate for the movie being viewed, is provided in graph area 1394. In other embodiments, popularity selector 1395 uses a different format, such as a drop-down menu instead of radio buttons.

Rating selector 1396 enables the user to rate the movie. Rating selector 1396 comprises a set of so-called radio buttons, from which one button can be selected. The default is "unrated". If a viewer wishes to rate the movie, she or he clicks on the appropriate number of stars, from one star to five stars. In other embodiments, rating selector 1396 uses a different format, such as a slider bar instead of radio buttons.

Although an illustrative embodiment of the invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A video processing system, comprising:
 a transcoder having a processor, a non-transitory computer memory, and stored instructions translatable by the processor for providing a plurality of services, the plurality of services including an ad placement service, the ad placement service provided by the transcoder of the video processing system comprising:
  responsive to receiving a request from a viewer to view a video,
  determining whether the video has been viewed before by any user of the video processing system, the determining comprising comparing a number of views of the video with a threshold;
  responsive to the number of views of the video not less than the threshold, indicating that the video has been viewed before, analyzing popularity characteristics of the video, the analyzing comprising:
   obtaining statistics of the video from play trails that track viewer viewing behavior, each play trail representing a timestamped sequence of actions that a viewer takes in playing the video, each play trail stored on the video processing system as a data structure, the data structure having a head that serves as a first statistical unit, the first statistical unit pointing to a next sequential statistical unit corresponding to a next sequential portion of the video, the statistics of the video including a number of playback events; and
   determining the popular characteristics of the video utilizing the statistics of the video;
  responsive to the number of views of the video being less than the threshold, obtaining and analyzing inherent characteristics of the video, the inherent characteristics of the video including scenes in the video, the analyzing including determining scene changes;
  determining whether the video processing system is operating in a real-time ad placement mode, a non-real-time ad placement mode or a hybrid ad placement mode;
  responsive to the video processing system operating in the real-time ad placement mode or the hybrid ad placement mode, analyzing viewer characteristics in context of the viewer, the viewer characteristics including demographic information of the viewer;
retrieving advertiser ad placement preferences, the advertiser ad placement preferences specifying advertiser-preferred video inherent characteristics, advertiser-preferred video popularity characteristics, advertiser-preferred viewer characteristics, and a price setting mechanism specific to an advertiser;
performing an ad placement price determination procedure which comprises positioning ads at various places in the video as a function of the advertiser-preferred video inherent characteristics relative to the inherent characteristics of the video that the viewer has requested to view, the advertiser-preferred video popularity characteristics relative to the popularity characteristics of the video analyzed by the transcoder, the advertiser-preferred viewer characteristics relative to the viewer characteristics of the viewer, and the price setting mechanism specific to the advertiser; and
automatically placing an ad into the video at a location and size within at least one frame of the video selected based on an outcome from the ad placement price determination procedure, wherein the video is delivered with the ad automatically placed in the video to a user device associated with the viewer.

2. The video processing system of claim 1, wherein the transcoder is external to the user device.

3. The video processing system of claim 2, wherein the transcoder resides on a video server communicatively connected to the user device over a network.

4. The video processing system of claim 1, wherein the transcoder is local to the user device.

5. The video processing system of claim 1, wherein responsive to the number of views of the video being less than the threshold, the transcoder is operable to perform an ad placement procedure to place ads so that the ads are uniformly distributed in time throughout the video.

6. The video processing system of claim 1, wherein responsive to the number of views of the video being less than the threshold, the transcoder is operable to perform an ad placement procedure comprising clustering ads into groups between portions of the video of two to three minutes duration, permitting four to six ads to be inserted for every eight to ten minutes of the video.

7. The video processing system of claim 1, wherein responsive to the number of views of the video being less than the threshold, the transcoder is operable to perform an ad placement procedure to place ads at the scene changes in the video or at mid-scene in the video.

8. A video processing method, comprising:
responsive to receiving a request from a viewer to view a video, determining whether the video has been viewed before by any user of a video processing system, the determining comprising comparing a number of views of the video with a threshold, the determining performed by a transcoder of the video processing system, the transcoder having a processor, a non-transitory computer memory, and stored instructions translatable by the processor, the transcoder configured for providing a plurality of services;
responsive to the number of views of the video not less than the threshold, indicating that the video has been viewed before, the transcoder analyzing popularity characteristics of the video, the analyzing comprising:
obtaining statistics of the video from play trails that track viewer viewing behavior, each play trail representing a timestamped sequence of actions that a viewer takes in playing the video, each play trail stored on the video processing system as a data structure, the data structure having a head that serves as a first statistical unit, the first statistical unit pointing to a next sequential statistical unit corresponding to a next sequential portion of the video, the statistics of the video including a number of playback events; and
determining the popular characteristics of the video utilizing the statistics of the video;
responsive to the number of views of the video being less than the threshold, obtaining and analyzing inherent characteristics of the video, the inherent characteristics of the video including scenes in the video, the analyzing including determining scene changes;
determining, by the transcoder, whether the video processing system is operating in a real-time ad placement mode, a non-real-time ad placement mode, or a hybrid ad placement mode;
responsive to the video processing system operating in the real-time ad placement mode or the hybrid ad placement mode, the transcoder analyzing viewer characteristics in context of the viewer, the viewer characteristics including demographic information of the viewer;
retrieving advertiser ad placement preferences, the retrieving performed by the transcoder, the advertiser ad placement preferences specifying advertiser-preferred video inherent characteristics, advertiser-preferred video popularity characteristics, advertiser-preferred viewer characteristics, and a price setting mechanism specific to an advertiser;
performing, by the transcoder, an ad placement price determination procedure which comprises positioning ads at various places in the video as a function of the advertiser-preferred video inherent characteristics relative to the inherent characteristics of the video that the viewer has requested to view, the advertiser-preferred video popularity characteristics relative to the popularity characteristics of the video analyzed by the transcoder, the advertiser-preferred viewer characteristics relative to the viewer characteristics of the viewer, and the price setting mechanism specific to the advertiser; and
automatically placing, by the transcoder, an ad into the video at a location and size within at least one frame of the video selected based on an outcome from the ad placement price determination procedure, wherein the video is delivered with the ad automatically placed in the video to a user device associated with the viewer.

9. The video processing method according to claim 8, wherein the transcoder is external to the user device.

10. The video processing method according to claim 9, wherein the transcoder resides on a video server communicatively connected to the user device over a network.

11. The video processing method according to claim 8, wherein the transcoder is local to the user device.

12. The video processing method according to claim 8, wherein responsive to the number of views of the video being less than the threshold, the transcoder is operable to perform an ad placement procedure to place ads so that the ads are uniformly distributed in time throughout the video.

13. The video processing method according to claim 8, wherein responsive to the number of views of the video being less than the threshold, the transcoder is operable to perform an ad placement procedure comprising clustering ads into groups between portions of the video of two to three minutes duration, permitting four to six ads to be inserted for every eight to ten minutes of the video.

14. The video processing method according to claim 8, wherein responsive to the number of views of the video being less than the threshold, the transcoder is operable to perform an ad placement procedure to place ads at the scene changes in the video or at mid-scene in the video.

15. A computer program product comprising a non-transitory computer readable medium storing instructions translatable by a processor of a transcoder of a video processing system to perform an ad placement service comprising:
    responsive to receiving a request from a viewer to view a video,
    determining whether the video has been viewed before by any user of the video processing system, the determining comprising comparing a number of views of the video with a threshold;
        responsive to the number of views of the video not less than the threshold, indicating that the video has been viewed before, analyzing popularity characteristics of the video, the analyzing comprising:
            obtaining statistics of the video from play trails that track viewer viewing behavior, each play trail representing a timestamped sequence of actions that a viewer takes in playing the video, each play trail stored on the video processing system as a data structure, the data structure having a head that serves as a first statistical unit, the first statistical unit pointing to a next sequential statistical unit corresponding to a next sequential portion of the video, the statistics of the video including a number of playback events; and
            determining the popular characteristics of the video utilizing the statistics of the video;
        responsive to the number of views of the video being less than the threshold, obtaining and analyzing inherent characteristics of the video, the inherent characteristics of the video including scenes in the video, the analyzing including determining scene changes;
    determining whether the video processing system is operating in a real-time ad placement mode, a non-real-time ad placement mode, or a hybrid ad placement mode;
    responsive to the video processing system operating in the real-time ad placement mode or the hybrid ad placement mode, analyzing viewer characteristics in context of the viewer, the viewer characteristics including demographic information of the viewer;
    retrieving advertiser ad placement preferences, the advertiser ad placement preferences specifying advertiser-preferred video inherent characteristics, advertiser-preferred video popularity characteristics, advertiser-preferred viewer characteristics, and a price setting mechanism specific to an advertiser;
    performing an ad placement price determination procedure which comprises positioning ads at various places in the video as a function of the advertiser-preferred video inherent characteristics relative to the inherent characteristics of the video that the viewer has requested to view, the advertiser-preferred video popularity characteristics relative to the popularity characteristics of the video analyzed by the transcoder, the advertiser-preferred viewer characteristics relative to the viewer characteristics of the viewer, and the price setting mechanism specific to the advertiser; and
    automatically placing an ad into the video at a location and size within at least one frame of the video selected based on an outcome from the ad placement price determination procedure, wherein the video is delivered with the ad automatically placed in the video to a user device associated with the viewer.

16. The computer program product of claim 15, wherein the transcoder is external to the user device and wherein the transcoder resides on a video server communicatively connected to the user device over a network.

17. The computer program product of claim 15, wherein the transcoder is local to the user device.

18. The computer program product of claim 15, wherein if the video has not been viewed before, the transcoder is operable to perform an ad placement procedure to place ads so that the ads are uniformly distributed in time throughout the video.

19. The computer program product of claim 15, wherein responsive to the number of views of the video being less than the threshold, the transcoder is operable to perform an ad placement procedure comprising clustering ads into groups between portions of the video of two to three minutes duration, permitting four to six ads to be inserted for every eight to ten minutes of the video.

20. The computer program product of claim 15, wherein responsive to the number of views of the video being less than the threshold, the transcoder is operable to perform an ad placement procedure to place ads at the scene changes in the video or at mid-scene in the video.

\* \* \* \* \*